US012722564B2

(12) United States Patent
Wu

(10) Patent No.: US 12,722,564 B2
(45) Date of Patent: Sep. 1, 2026

(54) IN-VEHICLE DEVICE AND DRIVING TRAJECTORY PROJECTION METHOD

(71) Applicant: MITAC DIGITAL TECHNOLOGY CORPORATION, Taoyuan City (TW)

(72) Inventor: Shang-Yi Wu, Taoyuan City (TW)

(73) Assignee: MITAC DIGITAL TECHNOLOGY CORPORATION, Taoyuan City (TW)

( * ) Notice: Subject to any disclaimer, the term of this patent is extended or adjusted under 35 U.S.C. 154(b) by 0 days.

(21) Appl. No.: 18/933,122

(22) Filed: Oct. 31, 2024

(65) Prior Publication Data

US 2025/0145082 A1 May 8, 2025

(30) Foreign Application Priority Data

Nov. 3, 2023 (TW) ................................ 112142552

(51) Int. Cl.
*B60Q 1/34* (2006.01)
*G06V 20/58* (2022.01)

(52) U.S. Cl.
CPC ............. *B60Q 1/346* (2013.01); *G06V 20/58* (2022.01); *B60Q 2400/50* (2013.01)

(58) Field of Classification Search
CPC .... B60Q 1/346; B60Q 2400/50; B60Q 1/507; B60Q 1/50; G06V 20/58
USPC ......................... 340/465, 468, 472, 475, 463
See application file for complete search history.

(56) References Cited

U.S. PATENT DOCUMENTS

2016/0207443 A1* 7/2016 Widdowson ......... B60Q 1/0011
2019/0009714 A1* 1/2019 Sakata .................. B60Q 1/503
2022/0219599 A1* 7/2022 Mochizuki ............. B60Q 1/507
2023/0271548 A1* 8/2023 Shibata .................. B60Q 1/543 340/468
2023/0314158 A1* 10/2023 Sugawara .............. B60Q 1/545 701/423

FOREIGN PATENT DOCUMENTS

| | | | |
|---|---|---|---|
| CN | 109664814 | A | 4/2019 |
| CN | 110103956 | A | 8/2019 |
| CN | 112519670 | A | 3/2021 |
| CN | 113581181 | B | 9/2022 |

(Continued)

OTHER PUBLICATIONS

Taiwan Patent Office, Office Action, Patent Application Serial No. TW112142552, issued Aug. 19, 2024.

*Primary Examiner* — Anh V La
(74) *Attorney, Agent, or Firm* — RABIN & BERDO, P.C.

(57) ABSTRACT

An in-vehicle device and a driving trajectory projection method are related to the in-vehicle device adapted to be disposed on a first vehicle. The in-vehicle device includes one or more projection modules, one or more camera modules, a communication module, a processing module, and a storage module. The projection module is configured to project a suggestion driving trajectory. The camera module is configured to capture a driving frame upon the first vehicle drives in a first lane. The driving frame includes an image of a second vehicle, and the second vehicle drives behind the first vehicle. The communication module is configured to receive a turn signal information of the first vehicle and a first driving speed of the first vehicle. The turn signal information is selected from a left-turn instruction, a right-turn instruction, or a straight-driving instruction.

16 Claims, 22 Drawing Sheets

(56) References Cited

FOREIGN PATENT DOCUMENTS

| | | | |
|---|---|---|---|
| CN | 116080521 | A | 5/2023 |
| CN | 116533867 | A | 8/2023 |
| CN | 116750003 | A | 9/2023 |
| TW | M438991 | U | 10/2012 |
| TW | I521484 | B | 2/2016 |
| TW | I786960 | B | 12/2022 |

* cited by examiner

10

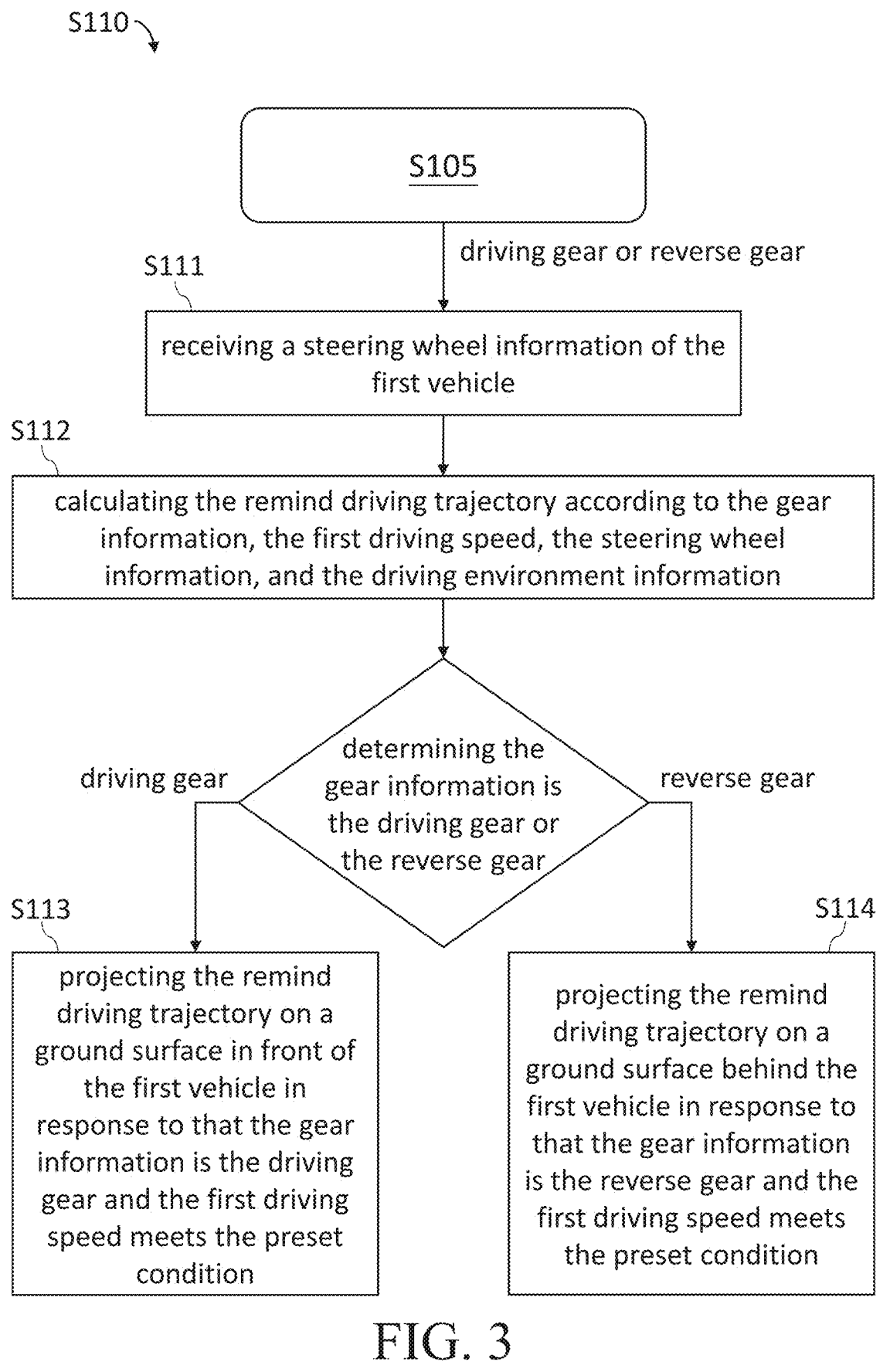

S110

S105 driving gear or reverse gear

S111 receiving a steering wheel information of the first vehicle

S112 calculating the remind driving trajectory according to the gear information, the first driving speed, the steering wheel information, and the driving environment information determining the gear information is the driving gear or the reverse gear driving gear reverse gear

S113 projecting the remind driving trajectory on a ground surface in front of the first vehicle in response to that the gear information is the driving gear and the first driving speed meets the preset condition

S114 projecting the remind driving trajectory on a ground surface behind the first vehicle in response to that the gear information is the reverse gear and the first driving speed meets the preset condition

FIG. 3

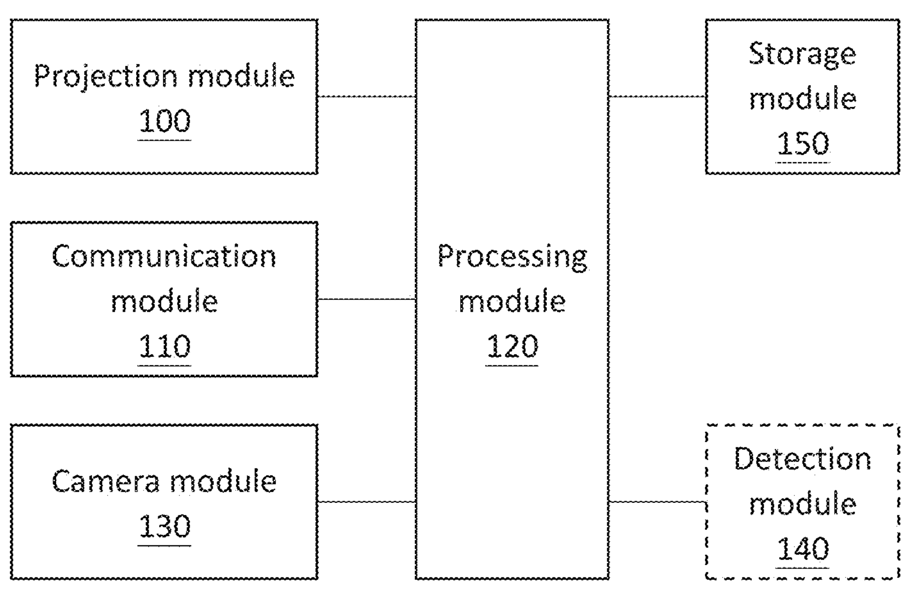
FIG. 12

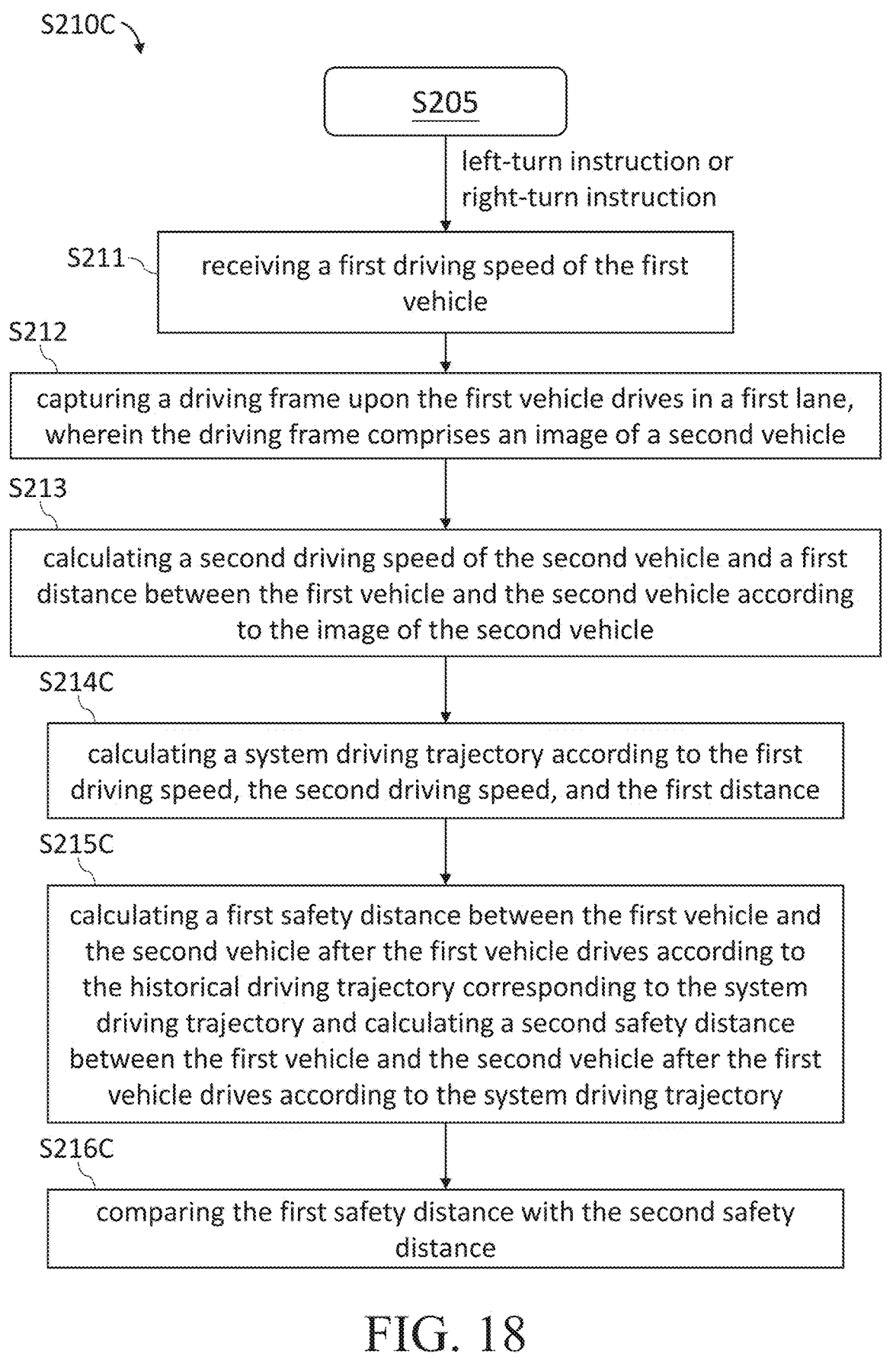

S210C

S205 left-turn instruction or right-turn instruction

S211 receiving a first driving speed of the first vehicle

S212 capturing a driving frame upon the first vehicle drives in a first lane, wherein the driving frame comprises an image of a second vehicle S213 calculating a second driving speed of the second vehicle and a first distance between the first vehicle and the second vehicle according to the image of the second vehicle S214C calculating a system driving trajectory according to the first driving speed, the second driving speed, and the first distance S215C calculating a first safety distance between the first vehicle and the second vehicle after the first vehicle drives according to the historical driving trajectory corresponding to the system driving trajectory and calculating a second safety distance between the first vehicle and the second vehicle after the first vehicle drives according to the system driving trajectory S216C comparing the first safety distance with the second safety distance

FIG. 18

IN-VEHICLE DEVICE AND DRIVING TRAJECTORY PROJECTION METHOD

CROSS-REFERENCE TO RELATED APPLICATION

This non-provisional application claims priority under 35 U.S.C. § 119(a) to patent application No. 112142552 filed in Taiwan, R.O.C. on Nov. 3, 2023, the entire contents of which are hereby incorporated by reference.

BACKGROUND

Technical Field

The present disclosure relates to a driver-assistance system, and particularly relates to an in-vehicle device and a driving trajectory projection method.

Related Art

With the progress of technology, advanced driver-assistance systems (ADASs) have become standard equipment for modern vehicles. The ADAS known to the inventor has a self-driving function, and the self-driving function can calculate a driving trajectory according to road conditions to allow that those vehicles equipped with the ADAS can perform the self-driving function according to the driving trajectory. Take electric vehicles of Tesla (hereinafter referred to as Tesla) for example, Tesla can perform an Autopilot function and a full self-driving (FSD) function, and the Autopilot function includes a self-turning function, a self-accelerating function, a self-braking function, or a self-reversing function.

However, due to traffic regulations in most countries, the FSD function can only be used in a few countries. Also, many security issues and uncertainty issues still exist in the FSD function. For example, those vehicles driving behind a vehicle with a FSD function (hereinafter referred to as an electric vehicle) cannot know a driving trajectory calculated by the FSD function of the electric vehicle, so that the vehicles cannot predict an actual driving track of the electric vehicle. In addition, when the electric vehicle performs the self-reversing function, pedestrians behind the electric vehicle cannot predict an actual reverse track of the electric vehicle.

SUMMARY

In order to address the problem(s) mentioned above, the inventors provide an in-vehicle device adapted to be disposed on a first vehicle. In some embodiments, the in-vehicle device comprises at least one projection module, at least one camera module, a communication module, a processing module, and a storage module. The at least one projection module is configured to project a suggestion driving trajectory. The at least one camera module is configured to capture a driving frame upon the first vehicle drives in a first lane. The driving frame comprises an image of a second vehicle, and the second vehicle drives behind the first vehicle. The communication module is configured to receive a turn signal information of the first vehicle and a first driving speed of the first vehicle. The turn signal information is selected from a left-turn instruction, a right-turn instruction, or a straight-driving instruction. The processing module is electrically connected to the at least one projection module, the at least one camera module, and the communication module. The processing module is configured to calculate a second driving speed of the second vehicle and a first distance between the first vehicle and the second vehicle according to the image of the second vehicle. The storage module is electrically connected to the processing module. In response to that the turn signal information is the left-turn instruction or the right-turn instruction, the processing module controls the at least one projection module to project the suggestion driving trajectory on a second lane, and the suggestion driving trajectory is selected from a historical driving trajectory or a system driving trajectory. In response to that the turn signal information is the straight-driving instruction, the processing module controls the at least one projecting module to stop projecting the suggestion driving trajectory on the second lane.

In some embodiments, the processing module is further configured to calculate the system driving trajectory according to the first driving speed, the second driving speed, and the first distance, and the processing module is further configured to store the system driving trajectory in the storage module as the historical driving trajectory corresponding to the system driving trajectory. The suggestion driving trajectory is the system driving trajectory.

In some embodiments, in response to that the historical driving trajectory corresponding to the system driving trajectory exists in the storage module, the suggestion driving trajectory is the historical driving trajectory. The historical driving trajectory has a historical turn signal information corresponding to the turn signal information, a historical first driving speed corresponding to the first driving speed, a historical second driving speed corresponding to the second driving speed, and a historical first distance corresponding to the first distance.

In some embodiments, in response to that the historical driving trajectory exists in the storage module, the processing module is further configured to calculate the system driving trajectory according to the first driving speed, the second driving speed, and the first distance, the processing module is further configured to calculate a first safety distance between the first vehicle and the second vehicle after the first vehicle drives according to the historical driving trajectory and a second safety distance between the first vehicle and the second vehicle after the first vehicle drives according to the system driving trajectory, and the processing module is further configured to compare the first safety distance with the second safety distance. In response to that a value of the first safety distance is greater than a value of the second safety distance, the suggestion driving trajectory is the historical driving trajectory. In response to that the value of the first safety distance is less than the value of the second safety distance, the suggestion driving trajectory is the system driving trajectory. The historical driving trajectory has a historical turn signal information corresponding to the turn signal information, a historical first driving speed corresponding to the first driving speed, a historical second driving speed corresponding to the second driving speed, and a historical first distance corresponding to the first distance.

In some embodiments, the driving frame further comprises an image of a third vehicle, the third vehicle drives in the first lane and drives in front of the first vehicle, the processing module is further configured to calculate a third driving speed of the third vehicle and a second distance between the first vehicle and the third vehicle according to the image of the third vehicle, and the processing module is further configured to calculate the system driving trajectory according to the first driving speed, the second driving speed, the third driving speed, the first distance, and the second distance. In response to that the historical driving trajectory exists in the storage module, the historical driving trajectory has a historical turn signal information corresponding to the turn signal information, a historical first driving speed corresponding to the first driving speed, a historical second driving speed corresponding to the second driving speed, a historical third driving speed corresponding to the third driving speed, a historical first distance corresponding to the first distance, and a historical second distance corresponding to the second distance.

The inventors further provide a driving trajectory projection method adapted to an in-vehicle device, and the in-vehicle device is adapted to be disposed on a first vehicle. In some embodiments, the driving trajectory projection method comprises: receiving a turn signal information of the first vehicle, wherein the turn signal information is selected from a left-turn instruction, a right-turn instruction, or a straight-driving instruction; performing a projection step to project a suggestion driving trajectory in response to that the turn signal information is the left-turn instruction or the right-turn instruction. The projection step comprises: receiving a first driving speed of the first vehicle; capturing a driving frame upon the first vehicle drives in a first lane. The driving frame comprises an image of a second vehicle, the second vehicle drives in a second lane and drives behind the first vehicle. The second lane is at a left side of the first lane or a right side of the first lane; calculating a second driving speed of the second vehicle and a first distance between the first vehicle and the second vehicle according to the image of the second vehicle; and projecting the suggestion driving trajectory on the second lane. The suggestion driving trajectory is selected from a historical driving trajectory or a system driving trajectory; and stopping projecting the suggestion driving trajectory in response to that the turn signal information is the straight driving instruction. The historical driving trajectory is stored in a storage module.

In some embodiments, the projection step further comprises: calculating the system driving trajectory according to the first driving speed, the second driving speed, and the first distance; and storing the system driving trajectory in the storage module as the historical driving trajectory corresponding to the system driving trajectory. The suggestion driving trajectory is the system driving trajectory.

In some embodiments, in response to that historical driving trajectory corresponding to the system driving trajectory exists in the storage module, the suggestion driving trajectory is the historical driving trajectory. The historical driving trajectory has a historical turn signal information corresponding to the turn signal information, a historical first driving speed corresponding to the first driving speed, a historical second driving speed corresponding to the second driving speed, and a historical first distance corresponding to the first distance.

In some embodiments, in response to that the historical driving trajectory exists in the storage module, and the projection step further comprises: calculating the system driving trajectory according to the first driving speed, the second driving speed, and the first distance; calculating a first safety distance between the first vehicle and the second vehicle after the first vehicle drives according to the historical driving trajectory and a second safety distance between the first vehicle and the second vehicle after the first vehicle drives according to the system driving trajectory; and comparing the first safety distance with the second safety distance. In response to that a value of the first safety distance is greater than a value of the second safety distance, the suggestion driving trajectory is the historical driving trajectory. In response to that the value of the first safety distance is less than the value of the second safety distance, the suggestion driving trajectory is the system driving trajectory. The historical driving trajectory has a historical turn signal information corresponding to the turn signal information, a historical first driving speed corresponding to the first driving speed, a historical second driving speed corresponding to the second driving speed, and a historical first distance corresponding to the first distance.

In some embodiments, the driving frame further comprises an image of a third vehicle, the third vehicle drives in the first lane and drives in front of the first vehicle, and the projection step further comprises: calculating a third driving speed of the third vehicle and a second distance between the first vehicle and the third vehicle according to the image of the third vehicle. The system driving trajectory is calculated according to the first driving speed, the second driving speed, the third driving speed, the first distance, and the second distance. In response to that the historical driving trajectory exists in the storage module, the historical driving trajectory has a historical turn signal information corresponding to the turn signal information, a historical first driving speed corresponding to the first driving speed, a historical second driving speed corresponding to the second driving speed, a historical third driving speed corresponding to the third driving speed, a historical first distance corresponding to the first distance, and a historical second distance corresponding to the second distance.

In some other embodiments, the in-vehicle device comprises at least one projection module, a communication module, at least one camera module, and a processing module. The at least one projection module is configured to project a remind driving trajectory. The communication module is configured to receive a gear information, a driving environment information, and a steering wheel information of the first vehicle, and the gear information is selected from a parking gear, a neutral gear, a driving gear, or a reverse gear. The at least one camera module is configured to continuously capture the driving environment information of the first vehicle along a capturing direction of the at least one camera module. The processing module electrically connected to the at least one projection module, the communication module, and the at least one camera module, and the processing module is configured to calculate the reminding driving trajectory according to the gear information, the driving environment information and the steering wheel information. In response to that the gear information is the driving gear, the processing module controls the at least one projection module to project the reminding driving trajectory on a ground surface in front of the first vehicle. In response to that the gear information is the reverse gear, the processing module controls the at least one projection module to project the reminding driving trajectory on a ground surface behind the first vehicle. In response to that the gear information is the parking gear or the neutral gear, the processing module controls the at least one projection module to stop projecting the reminding driving trajectory.

In some embodiments, the reminding driving trajectory comprises at least one straight-line trajectory.

In some embodiments, the steering wheel information comprises an angle value, the angle value is within an angle range, and the angle range has a minimum value, a first middle value, a second middle value, and a maximum value. In response to that the angle value is between the minimum value and the first middle value, the at least one straight-line trajectory is offset from a straight-line forward direction of the first vehicle by a first offset angle or is offset from a straight-line backward direction of the first vehicle by a second offset angle. In response to that the angle value is between the first middle value and the second middle value, the at least one straight-line trajectory is parallel with a direction of a vehicle body length of the first vehicle. In response to that the angle value is between the second middle value and the maximum value, the at least one straight-line trajectory is offset from the straight-line forward direction by a first offset angle or is offset from the straight-line backward direction by a second offset angle.

In some embodiments, the reminding driving trajectory comprises at least one curve trajectory, and the at least one curve trajectory has a radius of curvature.

In some embodiments, the steering wheel information comprises an angle value, the angle value is within an angle range, and the radius of curvature is related to the angle value. In response to that the angle value is 0 degree, the at least one curve trajectory is a straight-line trajectory.

In some other embodiments, the driving trajectory projection method comprises: receiving a gear information, a driving environment information and a first driving speed of the first vehicle. The gear information is selected from a parking gear, a neutral gear, a driving gear, or a reverse gear; performing a projection step to project a remind driving trajectory in response to that the gear information is the driving gear and the reverse gear and the first driving speed meets a preset condition. The projection step comprises: receiving a steering wheel information of the first vehicle; projecting the reminding driving trajectory on a ground surface in front of the first vehicle in response to that the gear information is the driving gear and the first driving speed meets the preset condition; and projecting the reminding driving trajectory on a ground surface behind the first vehicle in response to that the gear information is the reverse gear and the first driving speed meets the preset condition; and stopping projecting the reminding driving trajectory in response to that the gear information is the parking gear and the neutral gear.

In conclusion, according to one or some embodiments, when an electronic vehicle performs the Autopilot function (for example, doing lane switching or reversing), the in-vehicle device can project the driving trajectory of the electronic vehicle on the ground surface to achieve effect of warning, so that vehicles or pedestrians near the electronic vehicle can immediately react to avoid danger. In addition, even for vehicles without ADAS functions, the in-vehicle device can assist the vehicle calculating a suitable driving trajectory and project the driving trajectory on the ground surface to achieve the same effect of warning.

BRIEF DESCRIPTION OF DRAWINGS

The instant disclosure will become more fully understood from the detailed description given herein below for illustration only, and therefore not limitative of the instant disclosure, wherein:

FIG. 3 illustrates a flow chart showing operations of an embodiment of the step S110 shown in FIG. 2;

FIG. 12 illustrates a module block diagram of a second embodiment of an in-vehicle device;

FIG. 18 illustrates a flow chart showing operations of a third embodiment of the step S210 shown in FIG. 13;

DETAILED DESCRIPTION

Figure 1:
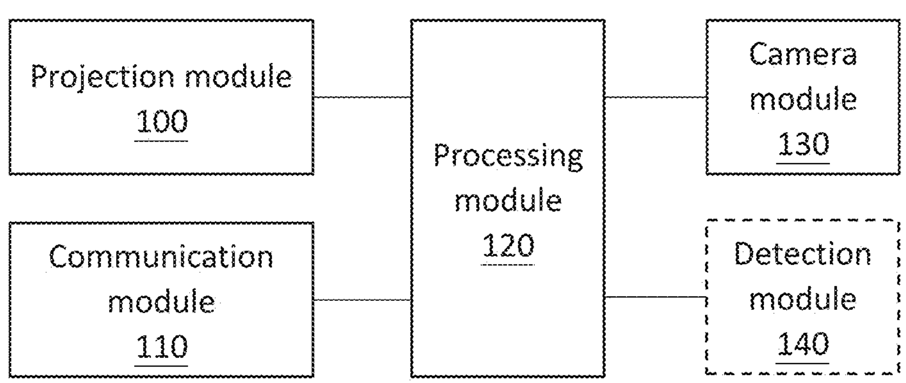
FIG. 1 illustrates a module block diagram of a first embodiment of an in-vehicle device.

Please refer to FIG. 1, one or some embodiments of the present disclosure provides an in-vehicle device 10 adapted to be disposed on a first vehicle (not shown in FIG. 1). The in-vehicle device 10 comprises at least one projection module 100, a communication module 110, a processing module 120, and at least one camera module 130. In some embodiments, the processing module 120 is electrically connected to the at least one projection module 100, the communication module 110, and the at least one camera module 130.

In some embodiments, the in-vehicle device 10 further comprises a detection module 140 (as shown in FIG. 1), and the detection module 140 is electrically connected to a first vehicle 21 and the processing module 120.

Figure 2:
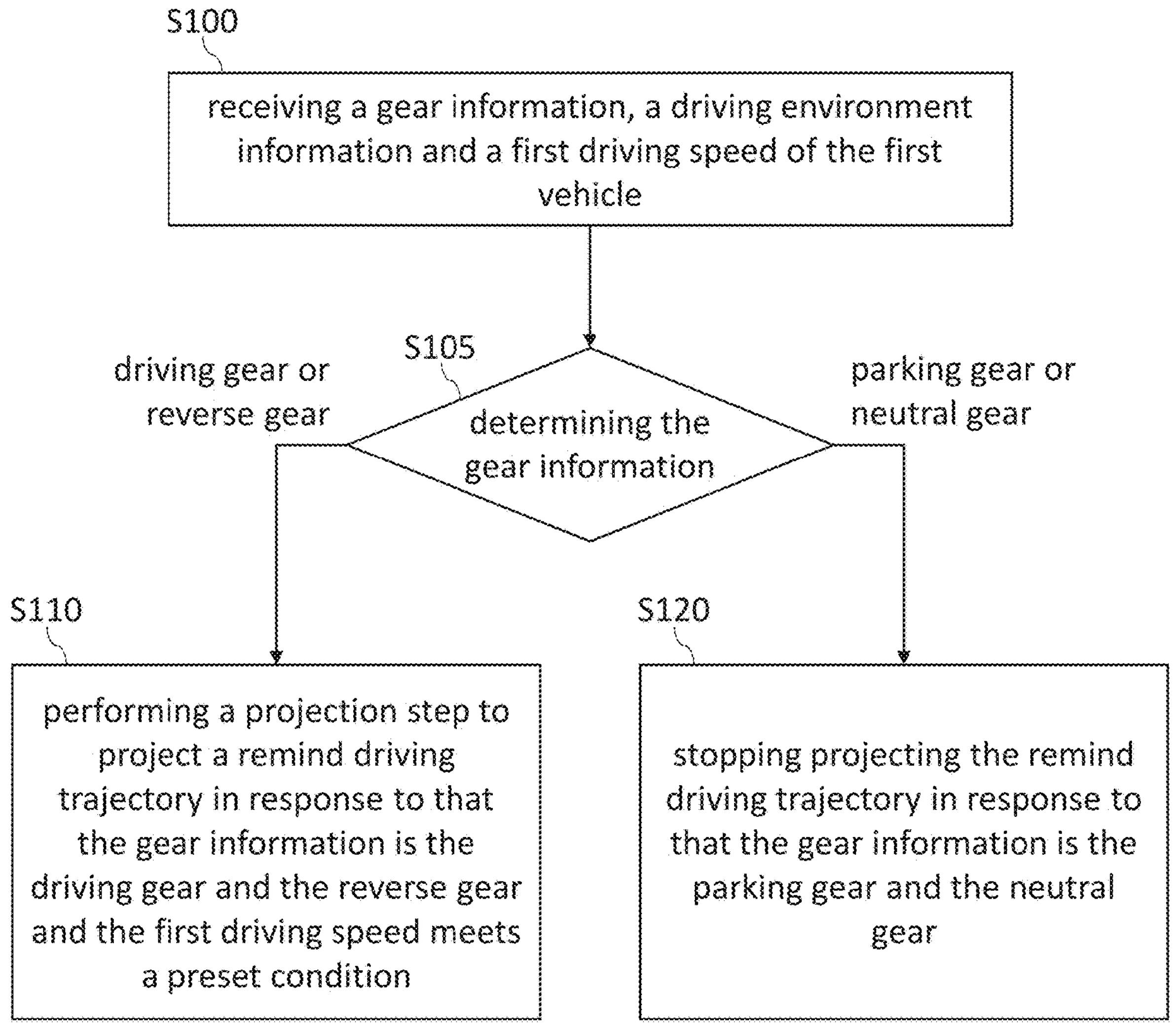
FIG. 2 illustrates a flow chart showing operations of an embodiment of the in-vehicle device shown in FIG. 1.

Please refer to FIG. 1 to FIG. 5. As shown in FIG. 2, when the in-vehicle device 10 starts operating, the in-vehicle device 10 continuously receives a gear information of the first vehicle 21 and a driving speed of the first vehicle 21 (hereinafter referred to as a first driving speed), and the in-vehicle device 10 captures a driving environment information of the first vehicle 21 along a capturing direction of the at least one camera module 130 through the at least one camera module 130 (the step S100). In some embodiments, the gear information is selected from a parking gear, a neutral gear, a driving gear, or a reverse gear, and the driving environment information comprises a ground surface marking information, a relative orientation of surrounding vehicles, and an information sign. Then, the in-vehicle device 10 determines the gear information through the processing module 120 (the step S105). In response to that the gear information is the driving gear or the reverse gear and the first driving speed meets a preset condition, the in-vehicle device 10 performs a projection step to project a remind driving trajectory (the step S110); in response to that the gear information is the parking gear or the neutral gear, the in-vehicle device 10 stops projecting the reminding driving trajectory (the step S120). Finally, after the step S110 or the step S120, the in-vehicle device 10 determines the gear information again to check whether the gear information changes (that is, performs the step S105 again) and continues the following steps.

In some embodiments, the preset condition is, for example, less than 10 kilometers-per-hour (km/hr), but the present disclosure is not limited thereto. In other words, in the present embodiment, only when the gear information is the driving gear or the reverse gear and the first driving speed is less than 10 (km/hr), the in-vehicle device 10 projects the reminding driving trajectory.

Figure 4:
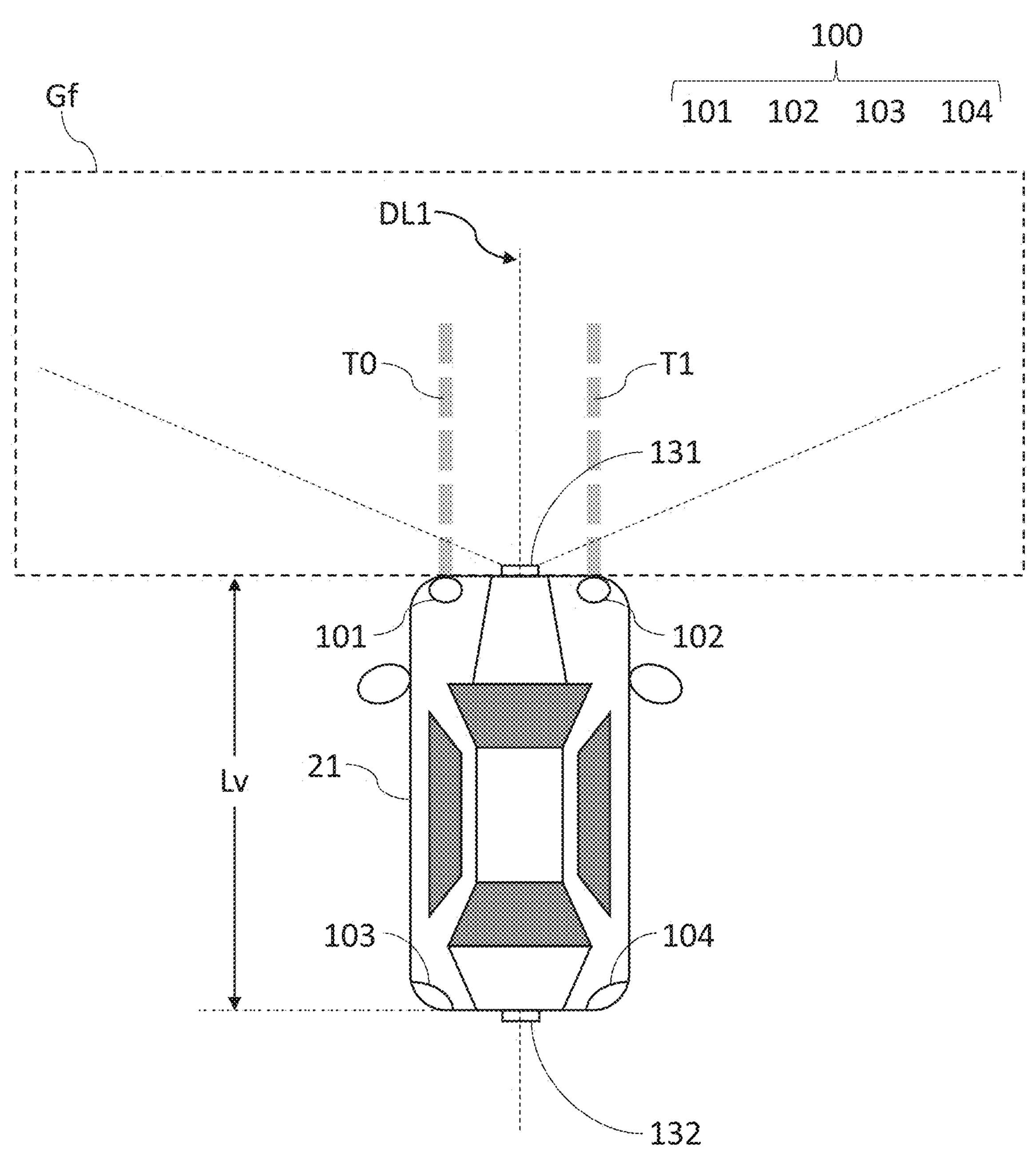
FIG. 4 illustrates a schematic view of a first embodiment of that the in-vehicle device shown in FIG. 1 projects a remind driving trajectory.
Figure 5:
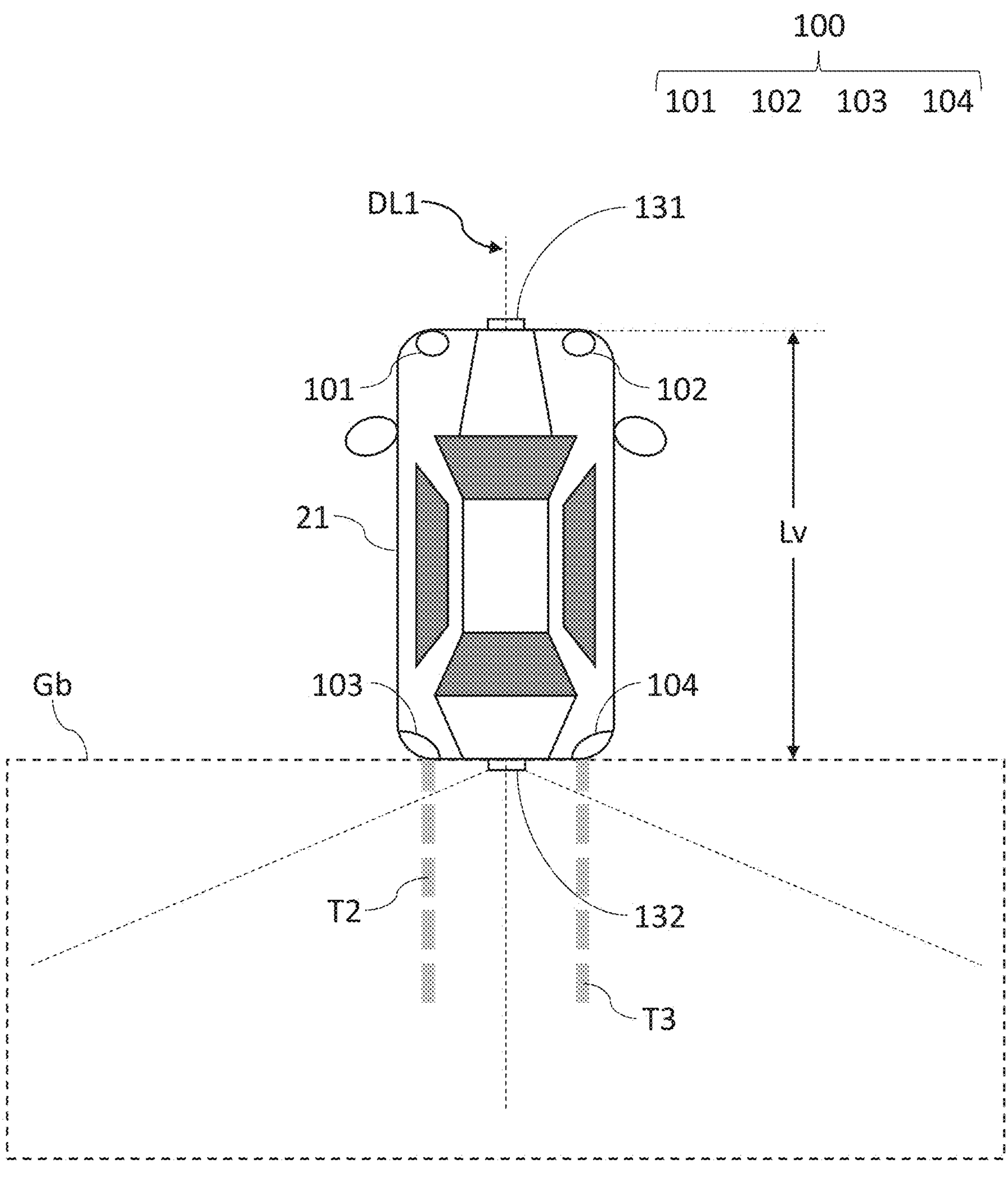
FIG. 5 illustrates a schematic view of a second embodiment of that the in-vehicle device shown in FIG. 1 projects a remind driving trajectory.

As shown in FIG. 3, in the projection step (the step S110), after the in-vehicle device 10 determines that the gear information is the driving gear or the reverse gear and the first driving speed meets the preset condition, the in-vehicle device 10 receives a steering wheel information of the first vehicle 21 (the step S111). Then, the vehicle device 10 calculates the reminding driving trajectory according to the gear information, the first driving speed, the steering wheel information, and the driving environment information (the step S112). In response to that the gear information is the driving gear and the first driving speed meets the preset condition, the in-vehicle device 10 controls the at least one projection module 100 (projection modules 101, 102) to project the reminding driving trajectory (corresponding to straight-line trajectories T0, T1) on a ground surface Gf in front of the first vehicle 21 (the step S113, as shown in FIG. 4); in response to that the gear information is the reverse gear and the first driving speed meets the preset condition, the in-vehicle device 10 controls the at least one projection module 100 (projection modules 103, 104) to project the reminding driving trajectory (corresponding to straight-line trajectories T2, T3) on a ground surface Gb behind the first vehicle 21 (the step S114, as shown in FIG. 5).

In some embodiments, the in-vehicle device 10 establishes a channel between the in-vehicle device 10 and a driving computer (not shown) of the first vehicle 21 through the communication module 110 to receive the gear information, the first driving speed, and the steering wheel information of the first vehicle 21 and inputs the gear information, the first driving speed, and the steering wheel information into the processing module 120. In some other embodiments, the in-vehicle device 10 directly detects the gear information, the first driving speed, and the steering wheel information in the driving computer of the first vehicle 21 through the detection module 140 and inputs the gear information, the first driving speed, and the steering wheel information into the processing module 120.

In some embodiments, the reminding driving trajectory comprises at least one straight-line trajectory. Take FIG. 4 for example, in the present embodiment, the reminding driving trajectory comprises the straight-line trajectories T0, T1. Further take FIG. 5 for example, in the present embodiment, the reminding driving trajectory comprises the straight-line trajectories T2, T3.

In some embodiments, the steering wheel information of the first vehicle 21 comprises an angle value, and the angle value is within an angle range. In some embodiments, the angle value is a rotation angle of the steering wheel of the first vehicle 21 (hereinafter referred to as a first steering wheel), and the angle value is 0 degree when the first steering wheel does not be rotated (that is, the first steering wheel is at an initial state). In some embodiments, when a driver of the first vehicle 21 controls the first steering wheel to be continuously rotated leftward from the initial state, an absolute value of the angle value gradually increases and the angle value is a negative value; when the driver of the first vehicle 21 controls the first steering wheel to be continuously rotated rightward from the initial state, an absolute value of the angle value gradually increases and the angle value is a positive value. In some embodiments, a positive/negative sign of the angle value represents a rotating direction of the first steering wheel; wherein, the positive sign represents that the first steering wheel is rotated rightward from the initial state, and the negative sign represents that the first steering wheel is rotated leftward from the initial state.

Please refer to TABLE 1, TABLE 1 is a list of some embodiments of the steering wheel information of the first vehicle 21. As shown in TABLE 1, in some embodiments, the angle range has a minimum value, a first middle value, a second middle value, and a maximum value. In some embodiments, the minimum value is a maximum angle that the first steering wheel is rotated leftward to the end from the initial state, and the maximum value is a maximum angle that the first steering wheel is rotated rightward to the end from the initial state. Take TABLE 1 for example, when the first steering wheel is rotated leftward from the initial state, the maximum of the rotation angle (that is, the angle value) of the first steering wheel is 540 degrees; when the first steering wheel is rotated rightward from the initial state, the maximum of the rotation angle (that is, the angle value) of the first steering wheel is also 540 degrees.

TABLE 1

| Minimum value | First middle value | Second middle value | Maximum value |
|---|---|---|---|
| −540 degrees | −30 degrees | 30 degrees | 540 degrees |

In some embodiments, the minimum value of the angle range is not limited to −540 degrees, and the maximum value of the angle range is not limited to 540 degrees. According to different models of vehicles, the minimum value and the maximum value will correspondingly change. For example, a steering wheel of a sedan can be only rotated leftward up to 540 degrees (that is, to be rotated leftward for one and a half rounds) or rotated rightward up to 540 degrees (that is, to be rotated rightward for one and a half rounds). Therefore, a minimum value in an angle range of the sedan is-540 degrees, and a maximum value in the angle range of the sedan is 540 degrees. By contrast, a steering wheel of a heavy truck can be rotated left up to 900 degrees (that is, to be rotated leftward for two and a half rounds) or rotated rightward up to 900 degrees (that is, to be rotated rightward for two and a half rounds). Therefore, a minimum value in an angle range of the heavy truck is-900 degrees, and a maximum value in the angle range of the heavy truck is 900 degrees.

Please refer to FIG. 1 to FIG. 9. In some embodiments, in response to that the angle value of the steering wheel information of the first vehicle 21 is between the minimum value and the first middle value, the at least one straight-line trajectory is offset leftward from a straight-line forward direction D1 of the first vehicle 21 by a first offset angle Ao1 or is offset rightward from a straight-line backward direction D2 of the first vehicle 21 by a second offset angle Ao2. In some embodiments, the straight-line forward direction D1 is a direction pointed by the first vehicle 21 when the first vehicle 21 drives straight-line, and the straight-line backward direction D2 is a direction pointed by the first vehicle 21 when the first vehicle 21 reverses straight-line.

Figure 6:
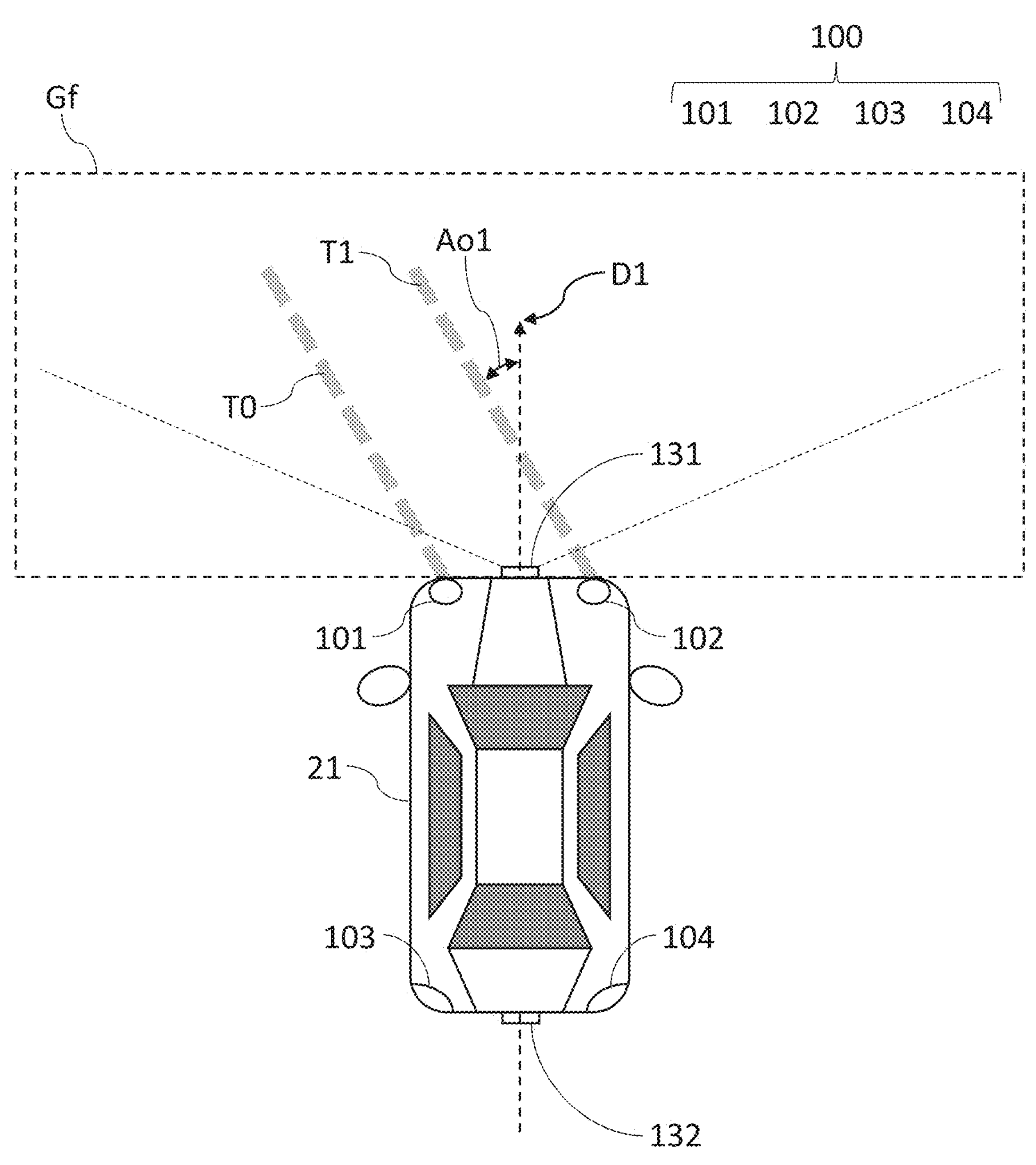
FIG. 6 illustrates a schematic view of a third embodiment of that the in-vehicle device shown in FIG. 1 projects a remind driving trajectory.
Figure 7:
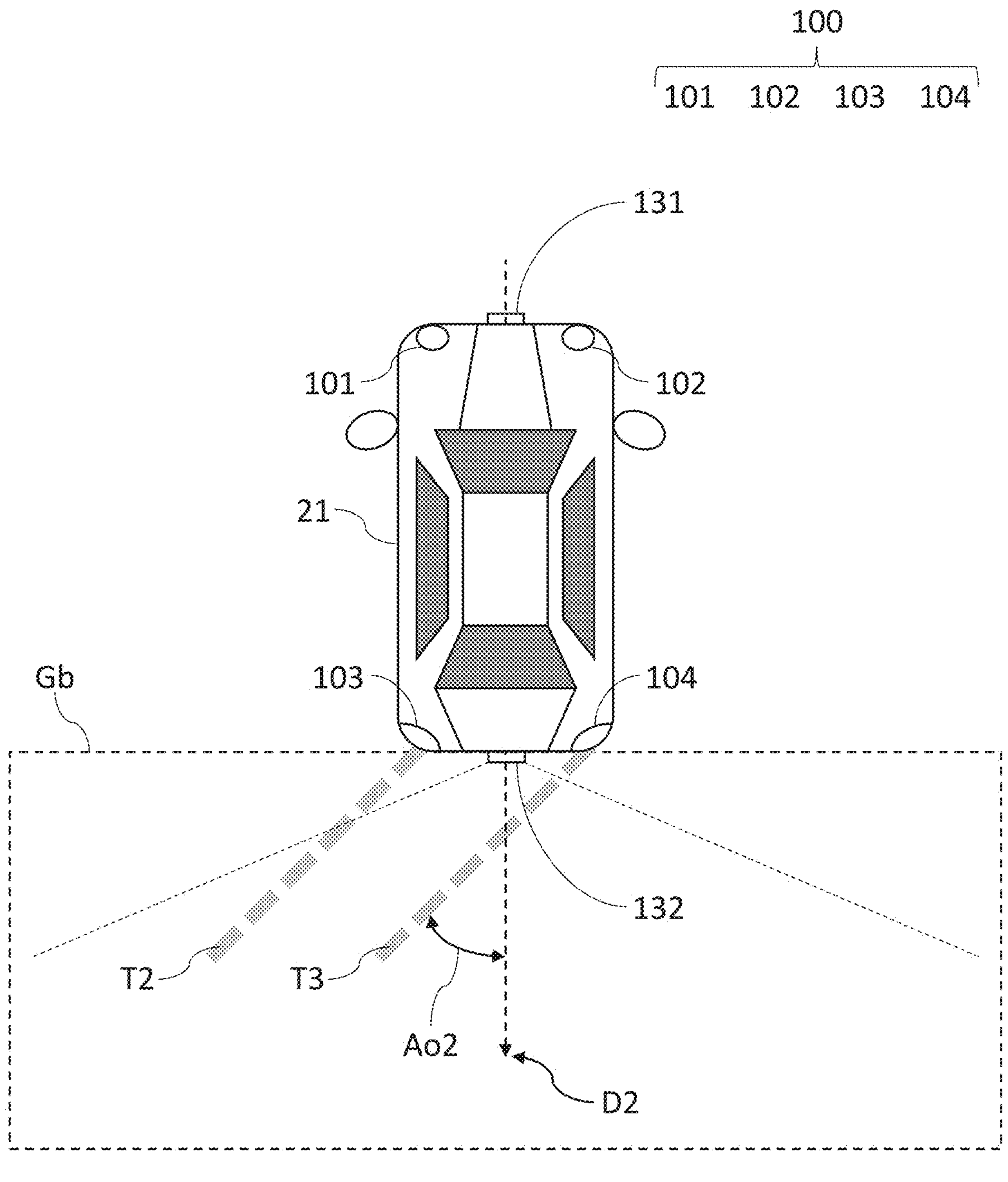
FIG. 7 illustrates a schematic view of a fourth embodiment of that the in-vehicle device shown in FIG. 1 projects a remind driving trajectory.

Take TABLE 1, FIG. 6, and FIG. 7 for example, when the angle value of the steering wheel information of the first vehicle 21 is between −540 degrees (the minimum value) and −30 degrees (the first middle value), it indicates that the first vehicle 21 wants to drive to the left or reverse to the left. Therefore, in response to that the gear information is the driving gear, the in-vehicle device 10 projects the straight-line trajectories T0, T1 that are offset leftward by the first offset angle Ao1 (compared to the straight-line forward direction D1) on the ground surface Gf in front of the first vehicle 21 to indicate that the first vehicle 21 is going to drive to the left (as shown in FIG. 6); in response to that the gear information is the reverse gear, the in-vehicle device 10 projects the straight-line trajectories T0, T1 that are offset rightward by the second offset angle Ao2 (compared to the straight-line backward direction D2) on the ground surface Gb behind the first vehicle 21 to indicate that the first vehicle 21 is going to reverse to the left (as shown in FIG. 7).

In some embodiments, the first offset angle Ao1 and the second offset angle Ao2 may be the same (not shown) or may not be the same (as shown in FIG. 6 and FIG. 7). In some embodiments, since it is difficult for the driver to notice situations behind the vehicle, the second offset angle Ao2 may be adjusted to a larger value to improve an effect of indicating directions.

In some embodiments, in response to that the angle value of the steering wheel information of the first vehicle 21 is between the first middle value and the second middle value, the at least one straight-line trajectory is parallel with a direction of a body length Lv of the first vehicle 21. In some embodiments, the direction of the body length Lv of the first vehicle 21 is parallel with the straight-line forward direction D1 and the straight-line backward direction D2.

Take TABLE 1, FIG. 4, and FIG. 5 for example, when the angle value of the steering wheel information of the first vehicle 21 is between −30 degrees (the first middle value) and 30 degrees (the second middle value), it indicates that the first vehicle 21 wants to drive nearly straight or reverse nearly straight. Therefore, in response to that the gear information is the driving gear, the in-vehicle device 10 projects the straight-line trajectories T0, T1 that are parallel with the body length Lv of the first vehicle 21 (corresponding to a dotted line DL1) on the ground surface Gf in front of the first vehicle 21 to indicate that the first vehicle 21 is going to drive straight (as shown in FIG. 4); in response to that the gear information is the reverse gear, the in-vehicle device 10 projects the straight-line trajectories T2, T3 that are parallel with the body length Lv of the first vehicle 21 (corresponding to the dotted line DL1) on the ground surface Gb behind the first vehicle 21 to indicate that the first vehicle 21 is going to reverse straight (as shown in FIG. 5).

In some embodiments, the first middle value is not limited to −30 degrees, and the second middle value is not limited to 30 degrees. According to different models of vehicles, the first middle value and the second middle value will correspondingly change. For example, when the steering wheel of the sedan is slightly rotated (such as but not limited to be rotated by 30 degrees), the sedan can still maintain driving straight or reversing straight. By contrast, since the steering wheel of the heavy truck is less insensitive, the heavy truck can still maintain driving straight or reversing straight even if the steering wheel of the heavy truck is moderately rotated (such as but not limited to be rotated by 60 degrees).

In some embodiments, in response to that the angle value of the steering wheel information of the first vehicle 21 is between the second middle value and the maximum value, the at least one straight-line trajectory is offset rightward from the straight-line forward direction by a first offset angle or is offset leftward from the straight-line backward direction by a second offset angle.

Figure 8:
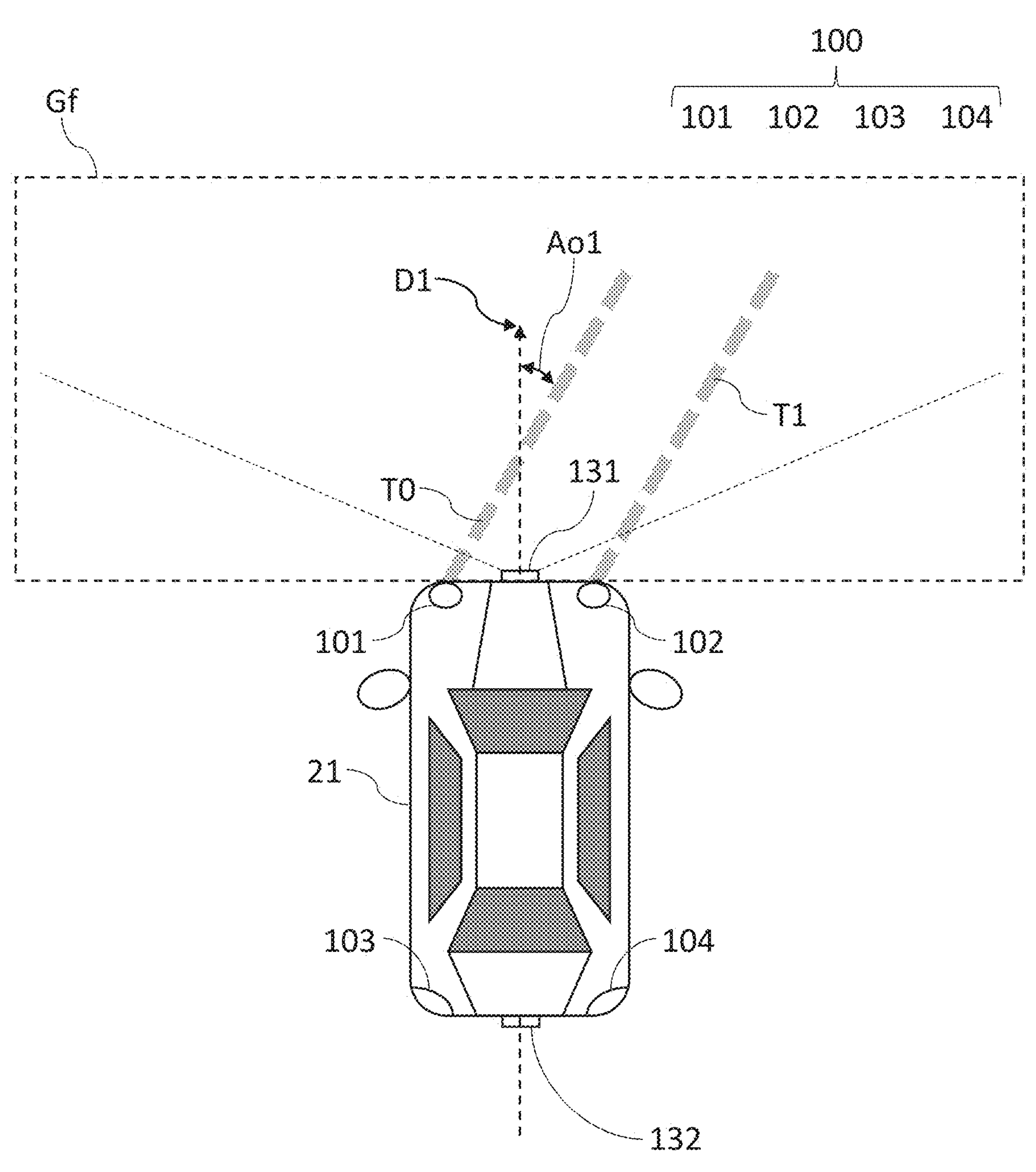
FIG. 8 illustrates a schematic view of a fifth embodiment of that the in-vehicle device shown in FIG. 1 projects a remind driving trajectory.
Figure 9:
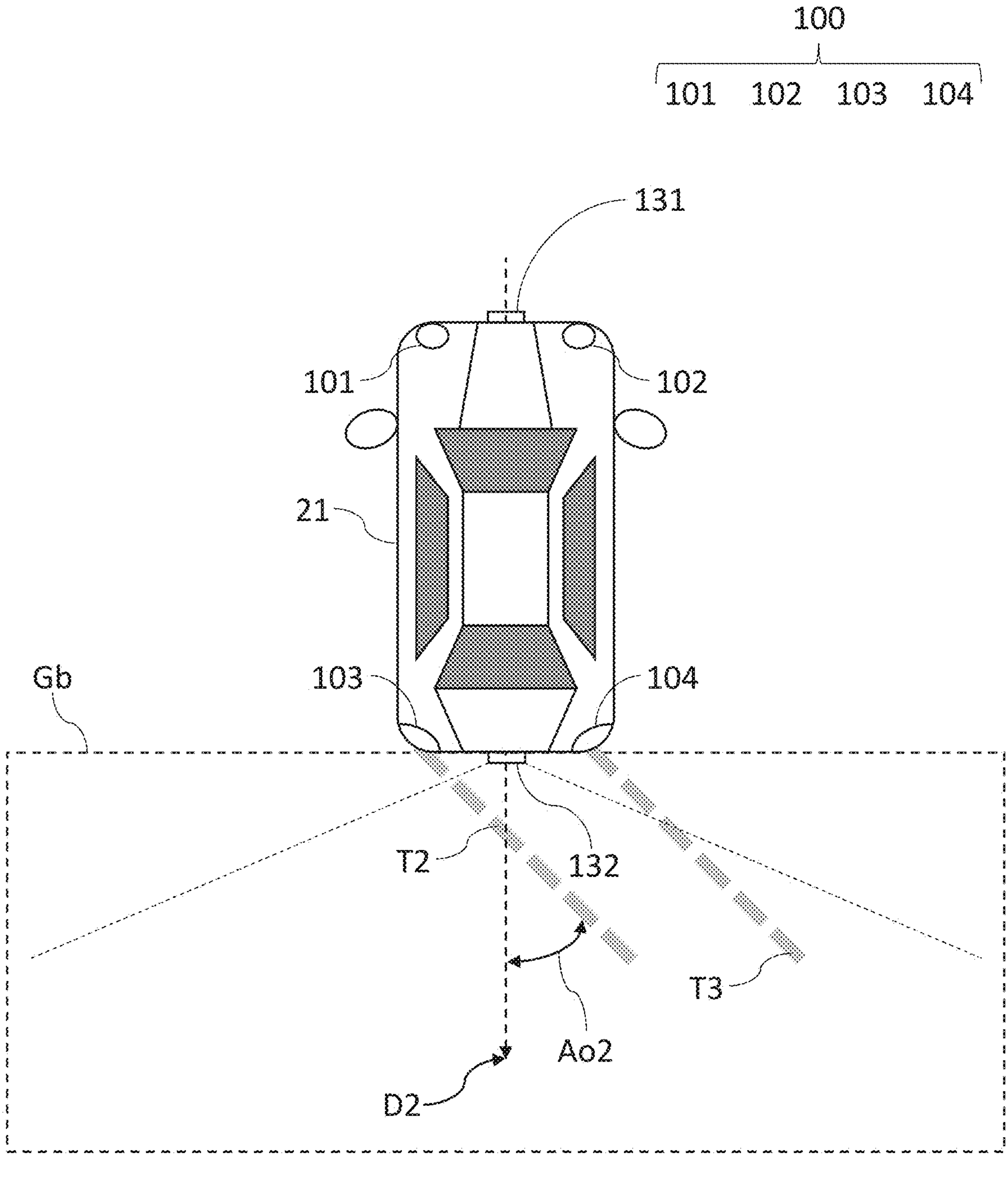
FIG. 9 illustrates a schematic view of a sixth embodiment of that the in-vehicle device shown in FIG. 1 projects a remind driving trajectory.

Take TABLE 1, FIG. 8, and FIG. 9 for example, when the angle value of the steering wheel information of the first vehicle 21 is between 30 degrees (the second middle value) and 540 degrees (the maximum value), it indicates that the first vehicle 21 wants to drive to the right or reverse to the right. Therefore, in response to that the gear information is the driving gear, the in-vehicle device 10 projects the straight-line trajectories T0, T1 that are offset rightward by the first offset angle Ao1 (compared to the straight-line forward direction D1) on the ground surface Gf in front of the first vehicle 21 to indicate that the first vehicle 21 is going to drive to the right (as shown in FIG. 8); in response to that the gear information is the reverse gear, the in-vehicle device 10 projects the straight-line trajectories T0, T1 that are offset leftward by the second offset angle Ao2 (compared to the straight-line backward direction D2) on the ground surface Gb behind the first vehicle 21 to indicate that the first vehicle 21 is going to reverse to the right (as shown in FIG. 9).

Please refer to FIG. 1 to FIG. 3, FIG. 10, and FIG. 11. In some embodiments, the reminding driving trajectory comprises at least one curve trajectory, and the at least one curve trajectory has a radius of a curvature. Take FIG. 10 for example, in the present embodiment, the reminding driving trajectory comprises curve trajectories T4, T5. Further take FIG. 11 for example, in the present embodiment, the reminding driving trajectory comprises curve trajectories T6, T7.

In some embodiments, the radius of the curvature is related to the angle value of the steering wheel information of the first vehicle 21. In some embodiments, the greater the angle value, the less the radius of the curvature (that is, the greater the curvature of the at least one curve trajectory); the less the angle value, the greater the radius of the curvature (that is, the less the curvature of the at least one curve trajectory). In some embodiments, when the angle value is 0 degree, it indicates that the radius of the curvature for the at least one curve trajectory is infinite (that is, the curvature of the at least one curve trajectory is 0). At this moment, the at least one curve trajectory is a straight-line trajectory (for example, the straight-line trajectories T0, T1 shown in FIG. 4 or the straight-line trajectories T2, T3 shown in FIG. 5).

Figure 10:
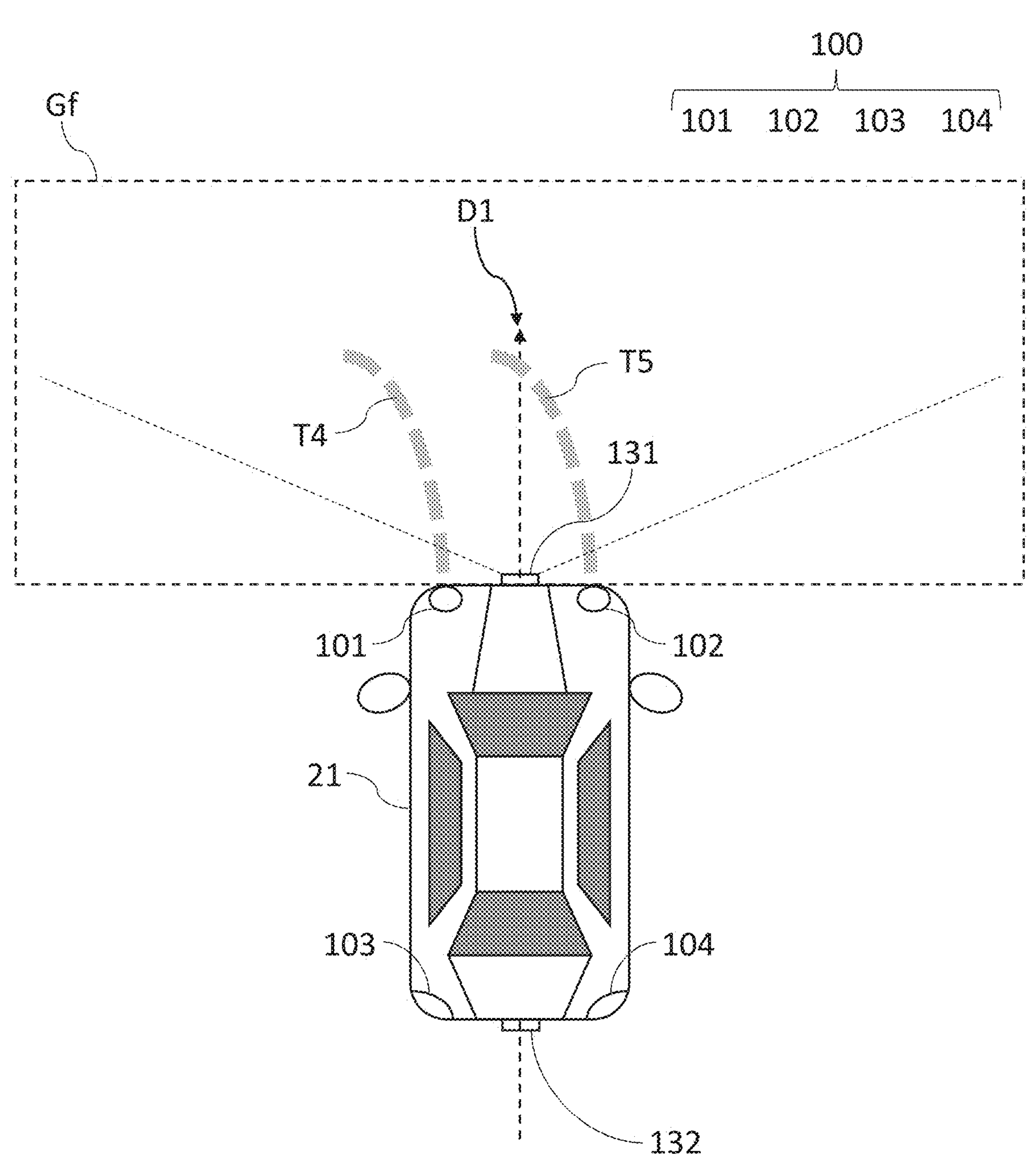
FIG. 10 illustrates a schematic view of a seventh embodiment of that the in-vehicle device shown in FIG. 1 projects a remind driving trajectory.

Take FIG. 10 for example, in the present embodiment, when the first vehicle 21 wants to drive to the left, the in-vehicle device 10 projects the curve trajectories T4, T5 that are curved leftward on the ground surface Gf in front of the first vehicle 21 to indicate that the first vehicle 21 is going to drive to the left. Further take FIG. 11 for example, in the present embodiment, when the first vehicle 21 wants to reverse to the right, the in-vehicle device 10 projects the curve trajectories T4, T5 that are curved to the right on the ground surface Gb behind the first vehicle 21 to indicate that the first vehicle 21 is going to reverse to the right.

Figure 11:
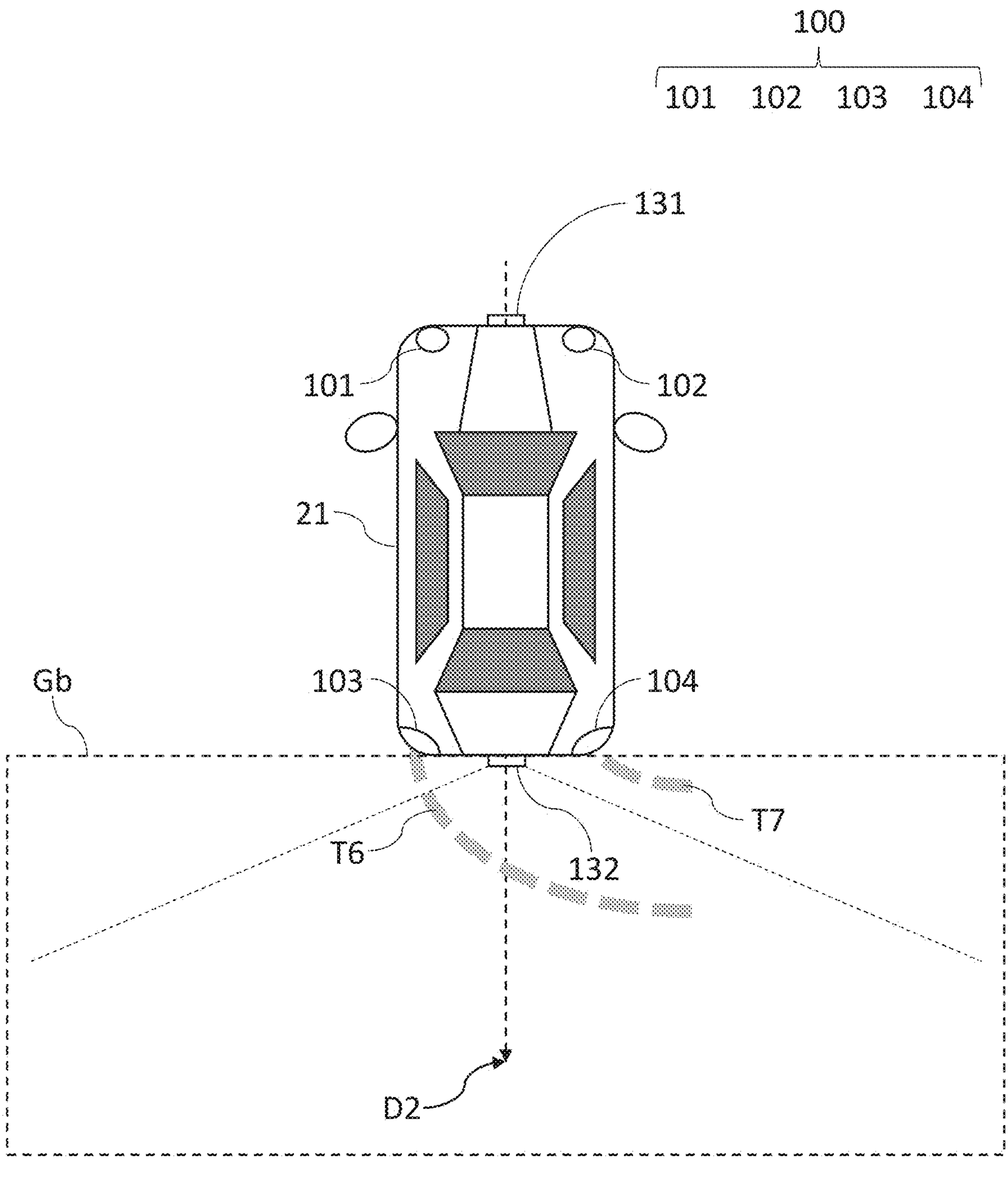
FIG. 11 illustrates a schematic view of an eighth embodiment of that the in-vehicle device shown in FIG. 1 projects a remind driving trajectory.

In some embodiments, the radius of the curvature for the curve trajectories T4, T5 and the radius of the curvature for the curve trajectories T6, T7 may be the same (not shown) or may not be the same (as shown in FIG. 10 and FIG. 11). In some embodiments, since it is difficult for the driver to notice situations behind the vehicle, the radius of the curvature for the curve trajectories T6, T7 may be adjusted to a smaller value (that is, the curvatures of the curve trajectories T6, T7 are adjusted to a larger value) to improve an effect of indicating directions.

Please refer to FIG. 12, the present disclosure further provides an in-vehicle device 10' adapted to be disposed on a first vehicle 21. The in-vehicle device 10' comprises at least one projection module 100, a communication module 110, a processing module 120, at least one camera module 130, and a storage module 150. In some embodiments, the processing module 120 is electrically connected to the at least one projection module 100, the communication module 110, the at least one camera module 130, and the storage module 150.

In some embodiments, the in-vehicle device 10' further comprises a detection module 140 (as shown in FIG. 12), and the detection module 140 is electrically connected to the first vehicle 21 and the processing module 120.

Figure 13:
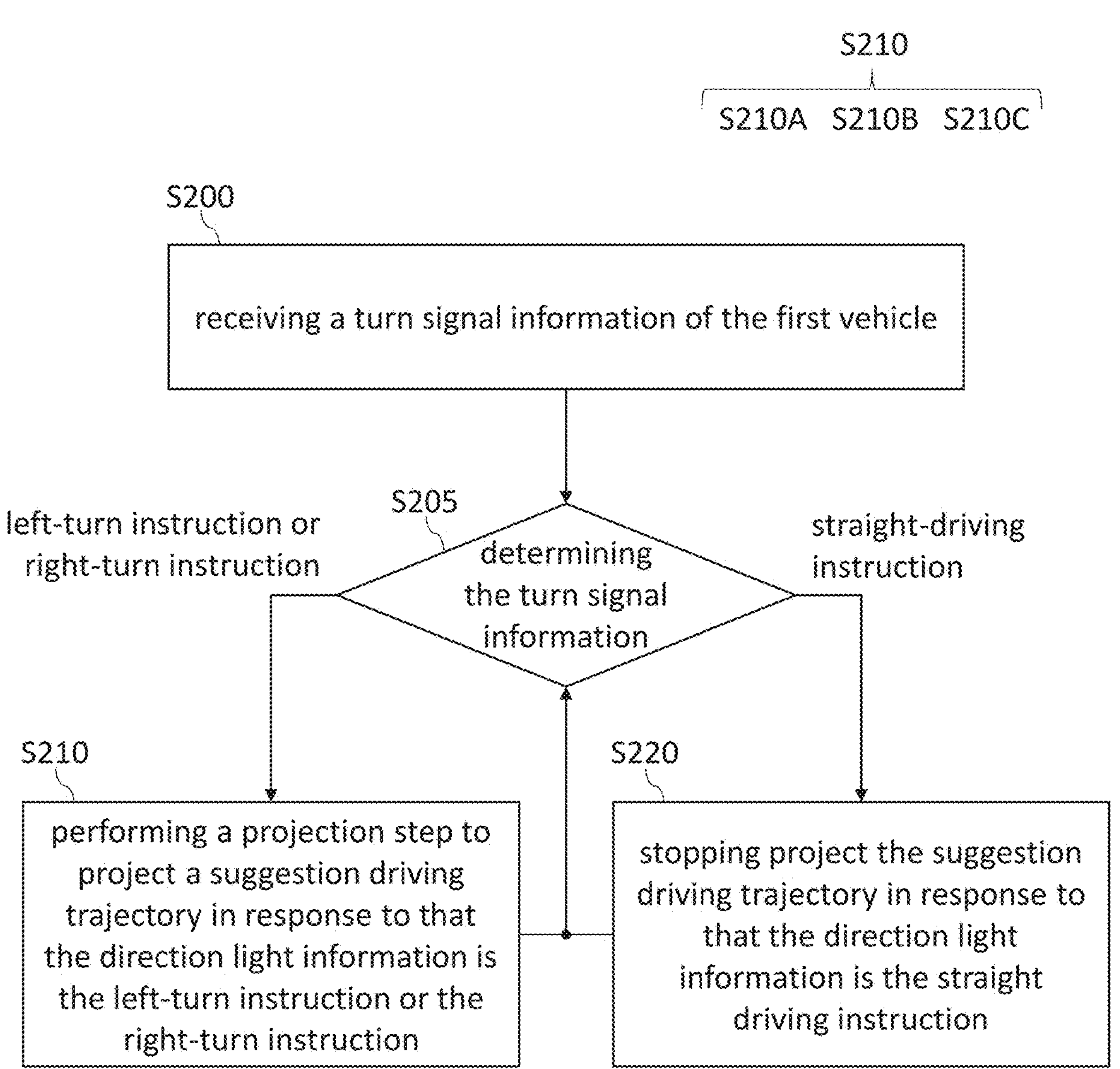
FIG. 13 illustrates a flow chart showing operations of an embodiment of the in-vehicle device shown in FIG. 12.

Please refer to FIG. 12 and FIG. 13. As shown in FIG. 13, when the in-vehicle device 10' starts operating, the in-vehicle device 10' continuously detects a turn signal information of the first vehicle 21 (the step S200). In some embodiments, the turn signal information is selected from a left-turn instruction, a right-turn instruction, or a straight-driving instruction. Then, the in-vehicle device 10' determines the turn signal information through the processing module 120 (the step S205). In response to that the turn signal information is the left-turn instruction or the right-turn instruction, the in-vehicle device 10' performs a projection step to project a suggestion driving trajectory (the step S210); in response to that the turn signal information is the straight driving instruction, the in-vehicle device 10' stops projecting the suggestion driving trajectory (the step S220). Finally, after the step S210 or the step S220, the in-vehicle device 10' determines the turn signal information again to check whether the turn signal information changes (that is, performs the step S205 again) and continues the following steps.

Please refer to FIG. 12 to FIG. 15. In a first embodiment of the projection step (the step S210A), after the in-vehicle device 10' determines that the turn signal information is the left-turn instruction or the right-turn instruction, the in-vehicle device 10' receives a driving speed of the first vehicle 21 (hereinafter referred to as a first driving speed, the step S211). Then, the in-vehicle device 10' captures a driving frame upon the first vehicle 21 drives in a first lane L1 through the at least one camera module 130, and the driving frame comprises an image of a second vehicle 22 (the step S212). In some embodiments, the second vehicle 22 drives in a second lane L2 and drives behind the first vehicle 21, and the second lane L2 is at a left side of the first lane L1 or a right side of the first lane L1.

After the step S212, the in-vehicle device 10' calculates a driving speed of the second vehicle 22 (hereinafter referred to as a second driving speed) and a first distance between the first vehicle 21 and the second vehicle 22 according to the image of the second vehicle 22 through the processing module 120 (the step S213). Then, the in-vehicle device 10' calculates a system driving trajectory according to the first driving speed, the second driving speed, and the first distance through the processing module 120 (the step S214A). After that, the in-vehicle device 10' stores the system driving trajectory in the storage module 150 as a historical driving trajectory corresponding to the system driving trajectory (the step S215A), and functions of the historical driving trajectory will be described later. Finally, the in-vehicle device 10' projects the system driving trajectory on the second lane L2 through the at least one projection module 100 (the step S216A, corresponding to the step S210).

Figure 15:
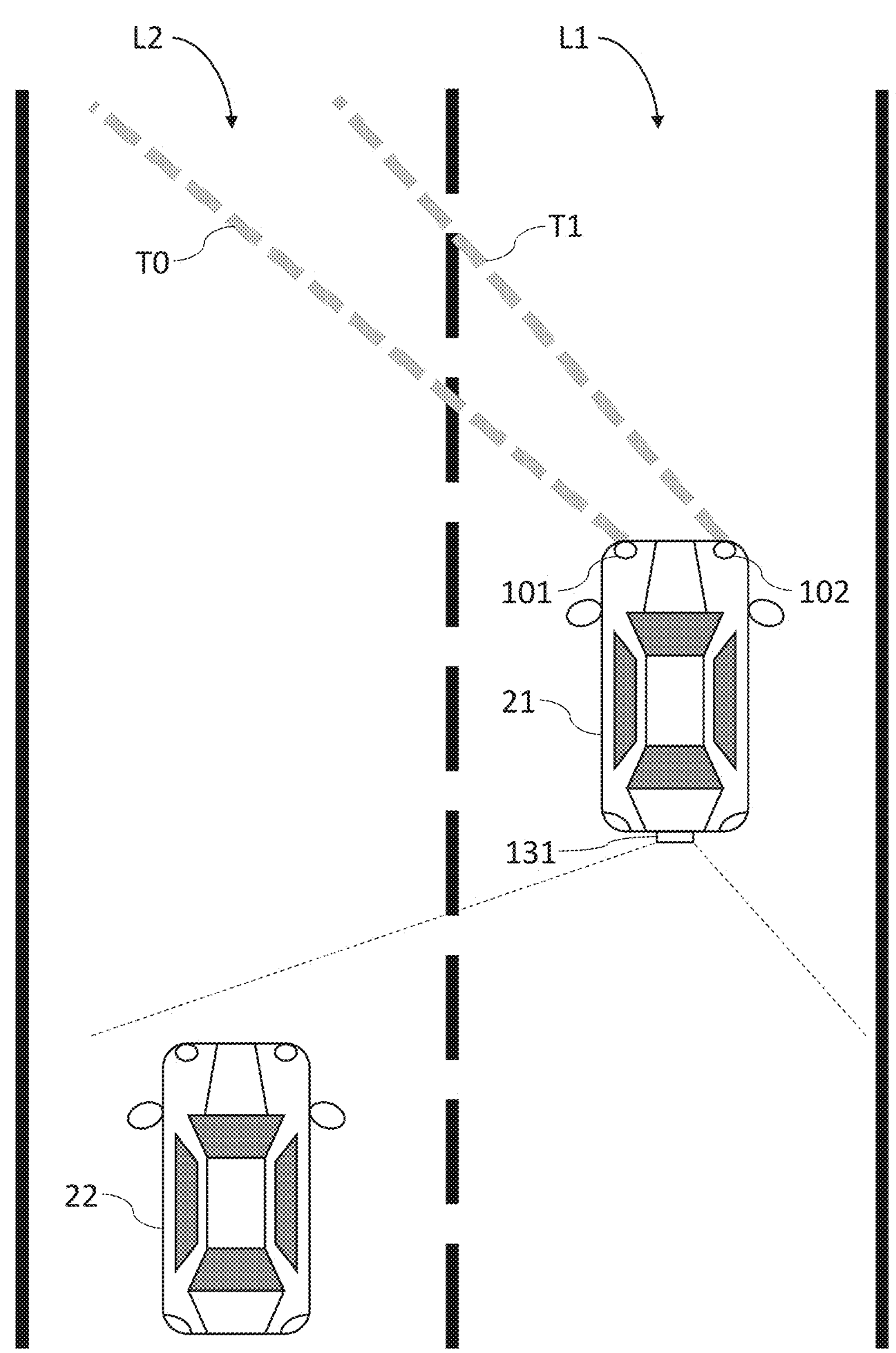
FIG. 15 illustrates a schematic view of a first embodiment of that the in-vehicle device shown in FIG. 12 projects a suggestion driving trajectory.

Take FIG. 15 for example, when the first vehicle 21 wants to switch from the first lane L1 to the second lane L2 on the left, the driver of the first vehicle 21 activates a left-turn signal of the first vehicle 21 (that is, the left-turn instruction in the turn signal information of the first vehicle 21) to warn the second vehicle 22 that drives in the second lane L2 and drives behind the first vehicle 21. At this moment, the in-vehicle device 10' receives the left-turn instruction and the first driving speed of the first vehicle 21. Then, the in-vehicle device 10' captures a driving frame upon the first vehicle 21 drives in a first lane L1 through the camera module 131 disposed on the back of the first vehicle 21, and the driving frame captured by the camera module 131 comprises the image of the second vehicle 22. After that, the in-vehicle device 10' calculates the second driving speed of the second vehicle 22 and the first distance between the first vehicle 21 and the second vehicle 22 according to the image of the second vehicle 22 through the processing module 120, and the processing module 120 calculates the system driving trajectory according to the first driving speed, the second driving speed, and the first distance. Finally, the in-vehicle device 10' stores the system driving trajectory in the storage module 150 as the historical driving trajectory corresponding to the system driving trajectory through the processing module 120, and projects the system driving trajectory (the straight-line trajectories T0, T1) on the second lane L2 through the projection modules 101, 102.

Please refer to FIG. 12, FIG. 13, FIG. 16, and FIG. 17. In a second embodiment of the projection step (the step S210B), after the in-vehicle device 10' determines that the turn signal information is the left-turn instruction or the right-turn instruction, the in-vehicle device 10' receives a driving speed of the first vehicle 21 (hereinafter referred to as a first driving speed, the step S211). Then, the in-vehicle device 10' captures a driving frame upon the first vehicle 21 drives in a first lane L1 through the at least one camera module 130, and the driving frame comprises an image of a second vehicle 22 (the step S212). After that, the in-vehicle device 10' calculates a driving speed of the second vehicle 22 (hereinafter referred to as a second driving speed) and a first distance between the first vehicle 21 and the second vehicle 22 according to the image of the second vehicle 22 through the processing module 120 (the step S213), and the in-vehicle device 10' determines whether the historical driving trajectory corresponding to the system driving trajectory exists in the storage module 150 according to the first driving speed, the second driving speed, and the first distance (the step S214B). Finally, in response to that the historical driving trajectory corresponding to the system driving trajectory exists in the storage module, the in-vehicle device 10' projects the historical driving trajectory on the second lane L2 through the at least one projection module 100 (the step S215B, corresponding to the step S210).

Please refer to TABLE 2, TABLE 2 is a list of some embodiments of the historical driving trajectory stored in the storage module 150. In some embodiments, the historical driving trajectory has a historical turn signal information corresponding to the turn signal information, a historical first driving speed corresponding to the first driving speed, a historical second driving speed corresponding to the second driving speed, and a historical first distance corresponding to the first distance.

TABLE 2

| Historical driving trajectory | Historical turn signal information | Historical first driving speed | Historical second driving speed | Historical first distance |
|---|---|---|---|---|
| Trajectory 1 | Left-turn instruction | 90(km/hr) | 80(km/hr) | 200(m) |
| Trajectory 2 | Right-turn instruction | 100(km/hr) | 90(km/hr) | 300(m) |

Figure 17:
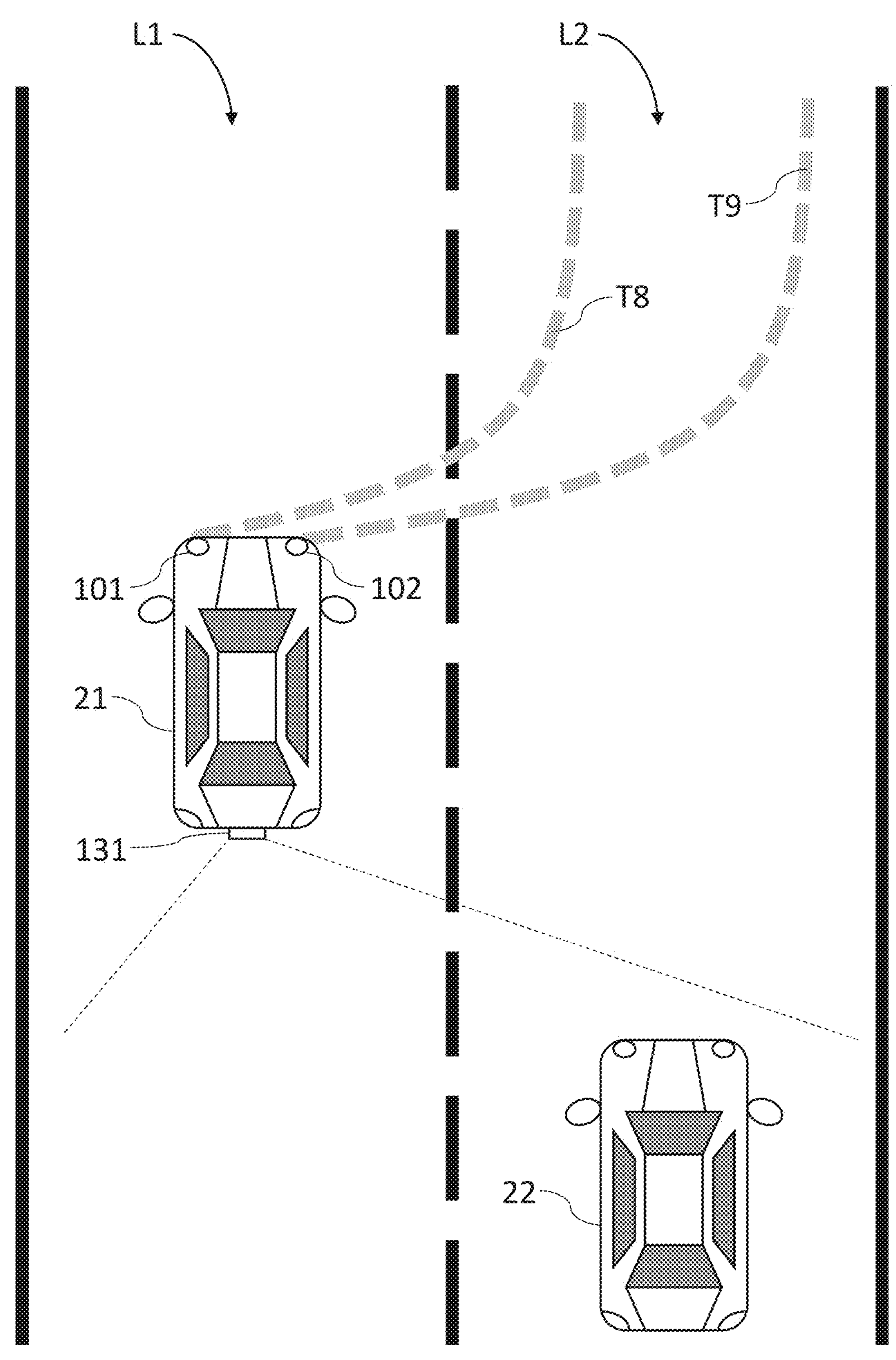
FIG. 17 illustrates a schematic view of a second embodiment of that the in-vehicle device shown in FIG. 12 projects a suggestion driving trajectory.

Take FIG. 17 and TABLE 2 for example, when the first vehicle 21 wants to switch from the first lane L1 to the second lane L2 on the right, the driver of the first vehicle 21 activates a right-turn signal of the first vehicle 21 (that is, the right-turn instruction in the turn signal information of the first vehicle 21) to warn the second vehicle 22 that drives in the second lane L2 and drives behind the first vehicle 21. At this moment, the in-vehicle device 10' receives the right-turn instruction and the first driving speed of the first vehicle 21. Then, the in-vehicle device 10' captures a driving frame upon the first vehicle 21 drives in a first lane L1 through the camera module 131 disposed on the back of the first vehicle 21, and the driving frame captured by the camera module 131 comprises the image of the second vehicle 22. After that, the in-vehicle device 10' calculates the second driving speed of the second vehicle 22 and the first distance between the first vehicle 21 and the second vehicle 22 according to the image of the second vehicle 22 through the processing module 120, and the processing module 120 determines whether the historical driving trajectory corresponding to the system driving trajectory exists in the storage module 150 according to the first driving speed, the second driving speed, and the first distance. Assume that the first vehicle speed obtained by the processing module 120 is 100 (km/hr), the second vehicle speed obtained by the processing module 120 is 90 (km/hr), and the first vehicle distance obtained by the processing module 120 is 300 meters (m), the historical driving trajectory corresponding to the system driving trajectory exists in the storage module 150 (corresponding to the trajectory 2 in TABLE 2). Therefore, the in-vehicle device 10' captures the trajectory 2 in TABLE 2 as the historical driving trajectory through the processing module 120 and projects the historical driving trajectory (the straight-line trajectories T8, T9) on the second lane L2 through the projection modules 101, 102.

Please refer to FIG. 12, FIG. 13, FIG. 18 to FIG. 20, and TABLE 2. In a third embodiment of the projection step (the step S210C), after the in-vehicle device 10' determines the turn signal information is the left-turn instruction or the right-turn instruction, the in-vehicle device 10' receives a driving speed of the first vehicle 21 (hereinafter referred to as a first driving speed, the step S211). Then, the in-vehicle device 10' captures a driving frame upon the first vehicle 21 drives in a first lane L1 through the at least one camera module 130, and the driving frame comprises an image of a second vehicle 22 (the step S212). In some embodiments, the second vehicle 22 drives in a second lane L2 and drives behind the first vehicle 21, and the second lane L2 is at a left side of the first lane L1 or a right side of the first lane L1.

After the step S212, the in-vehicle device 10' calculates a driving speed of the second vehicle 22 (hereinafter referred to as a second driving speed) and a first distance between the first vehicle 21 and the second vehicle 22 according to the image of the second vehicle 22 through the processing module 120 (the step S213), and the processing module 120 calculates a system driving trajectory according to the first driving speed, the second driving speed, and the first distance (the step S214C). After that, the in-vehicle device 10' calculates a first safety distance Ds1 between the first vehicle 21 and the second vehicle 22 after the first vehicle 21 drives according to the historical driving trajectory corresponding to the system driving trajectory and calculates a second safety distance Ds2 between the first vehicle 21 and the second vehicle 22 after the first vehicle 21 drives according to the system driving trajectory through the processing module 120 (the step S215C). Finally, the in-vehicle device 10' compares the first safety distance Ds1 with the second safety distance Ds2 through the processing module 120 (the step S216C). In some embodiments, in response to that a value of the first safety distance Ds1 is greater than a value of the second safety distance Ds2, the in-vehicle device 10' projects the historical driving trajectory corresponding to the system driving trajectory through the at least one projection module 100; in response to that the value of the first safety distance Ds1 is less than the value of the second safety distance Ds2, the in-vehicle device 10' projects the system driving trajectory through the at least one projection module 100.

Figure 19:
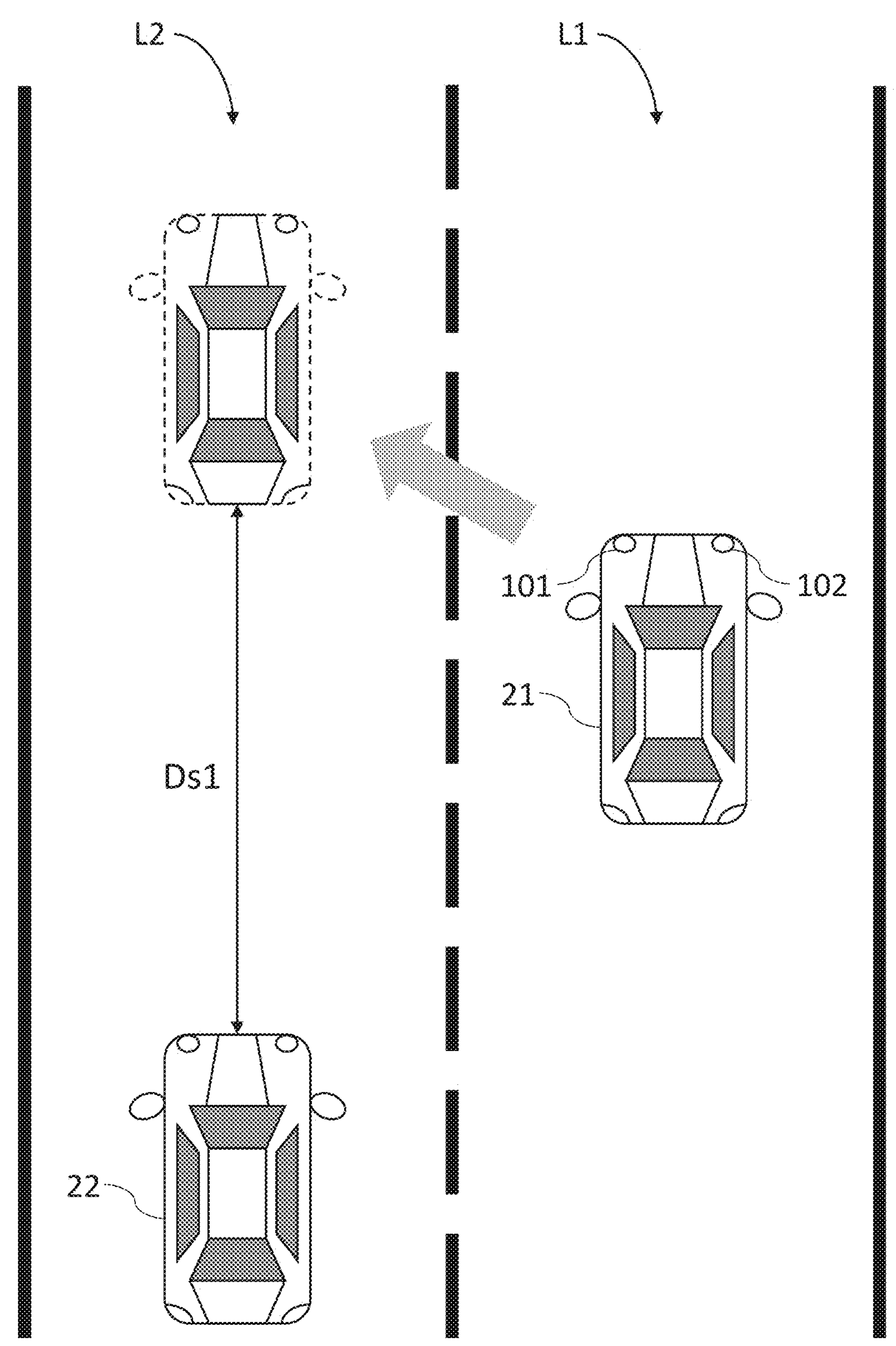
FIG. 19 illustrates a schematic view of an embodiment of the in-vehicle device shown in FIG. 12 after a first vehicle drives according to a historical driving trajectory.
Figure 20:
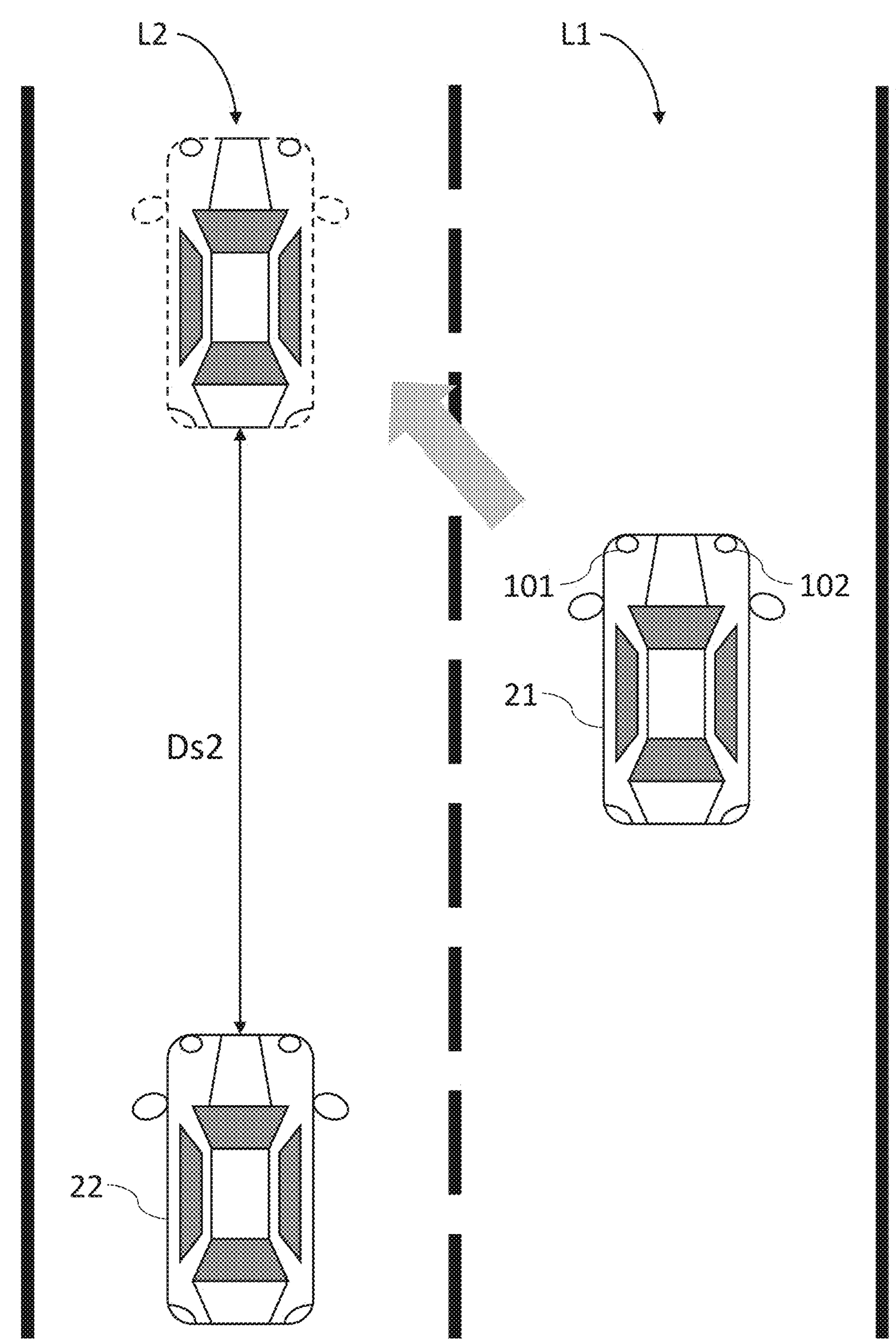
FIG. 20 illustrates a schematic view of an embodiment of the in-vehicle device shown in FIG. 12 after the first vehicle drives according to a system driving trajectory.
Figure 21:
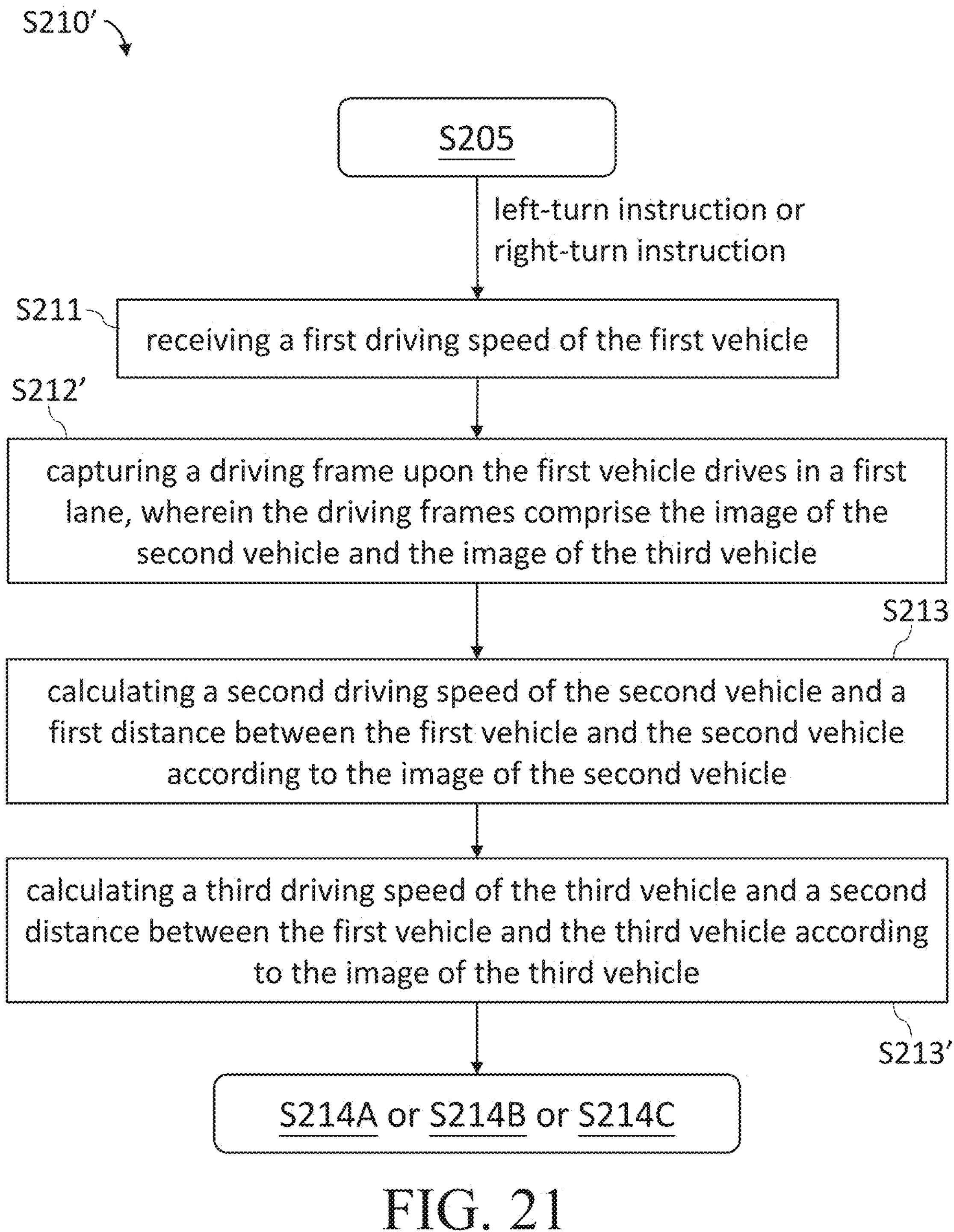
FIG. 21 illustrates a flow chart showing operations of an embodiment after the step S205 shown in FIG. 13.

Take FIG. 19, FIG. 20, and TABLE 2 for example. FIG. 19 illustrates a schematic view that the first vehicle 21 drives according to the historic driving trajectory, FIG. 20 illustrates a schematic view that the first vehicle 21 drives according to the system driving trajectory, and the historical driving trajectory is, for example, trajectory 1 in TABLE 2, but the present disclosure is not limited thereto. In the present embodiment, the value of the first safety distance Ds1 between the first vehicle 21 and the second vehicle 22 after the first vehicle 21 drives according to the historical driving trajectory is less than the value of the second safety distance Ds2 between the first vehicle 21 and the second vehicle 22 after the first vehicle 21 drives according to the system driving trajectory. In other words, in the present embodiment, the first vehicle 21 drives according to the system driving trajectory is safer than the first vehicle 21 drives according to the historical driving trajectory. Therefore, the first vehicle 21 projects the system driving trajectory on the second lane L2 through the projection modules 101, 102 (not shown).

Please refer to FIG. 12, FIG. 13, FIG. 21, and FIG. 22. In a fourth embodiment of the projection step (the step S210'), the driving frame captured by the in-vehicle device 10' comprises the image of a second vehicle 22 and an image of a third vehicle 23 (the step S212'), and the processing module 120 is further configured to calculate a driving speed of the third vehicle 23 (hereinafter referred to as a third driving speed) and a second distance between the first vehicle and the third vehicle according to the image of the third vehicle 23 (the step S213'). In some embodiments, the third vehicle 23 drives in the first lane L1 and drives in front of the first vehicle 21.

In other words, in the present embodiment, in response to that vehicles are not only in front of the first vehicles 21 but also behind the first vehicle 21, the in-vehicle device 10' captures the historical driving trajectory corresponding to the system driving trajectory (corresponding to the step S214B) according to the first driving speed, information of the vehicle behind the first vehicle 21 (comprising the second driving speed and the first distance), and information of the vehicle in front of the first vehicle 21 (comprising the third driving speed and the second distance), immediately calculates the system driving trajectory (corresponding to the step S214A and the step S214C) according to the first driving speed, information of the vehicle behind the first vehicle 21 (comprising the second driving speed and the first distance), and information of the vehicle in front of the first vehicle 21 (comprising the third driving speed and the second distance), or the in-vehicle device 10' compares the value of the first safety distance Ds1 with the second safety distance Ds2 (corresponding to the step S216C) after the first safety distance Ds1 between the first vehicle 21 and the second vehicle 22 after the first vehicle 21 drives according to the historical driving trajectory corresponding to the system driving trajectory and the second safety distance Ds2 between the first vehicle 21 and the second vehicle 22 after the first vehicle 21 drives according to the system driving trajectory are calculated (corresponding to the step S215C).

Figure 22:
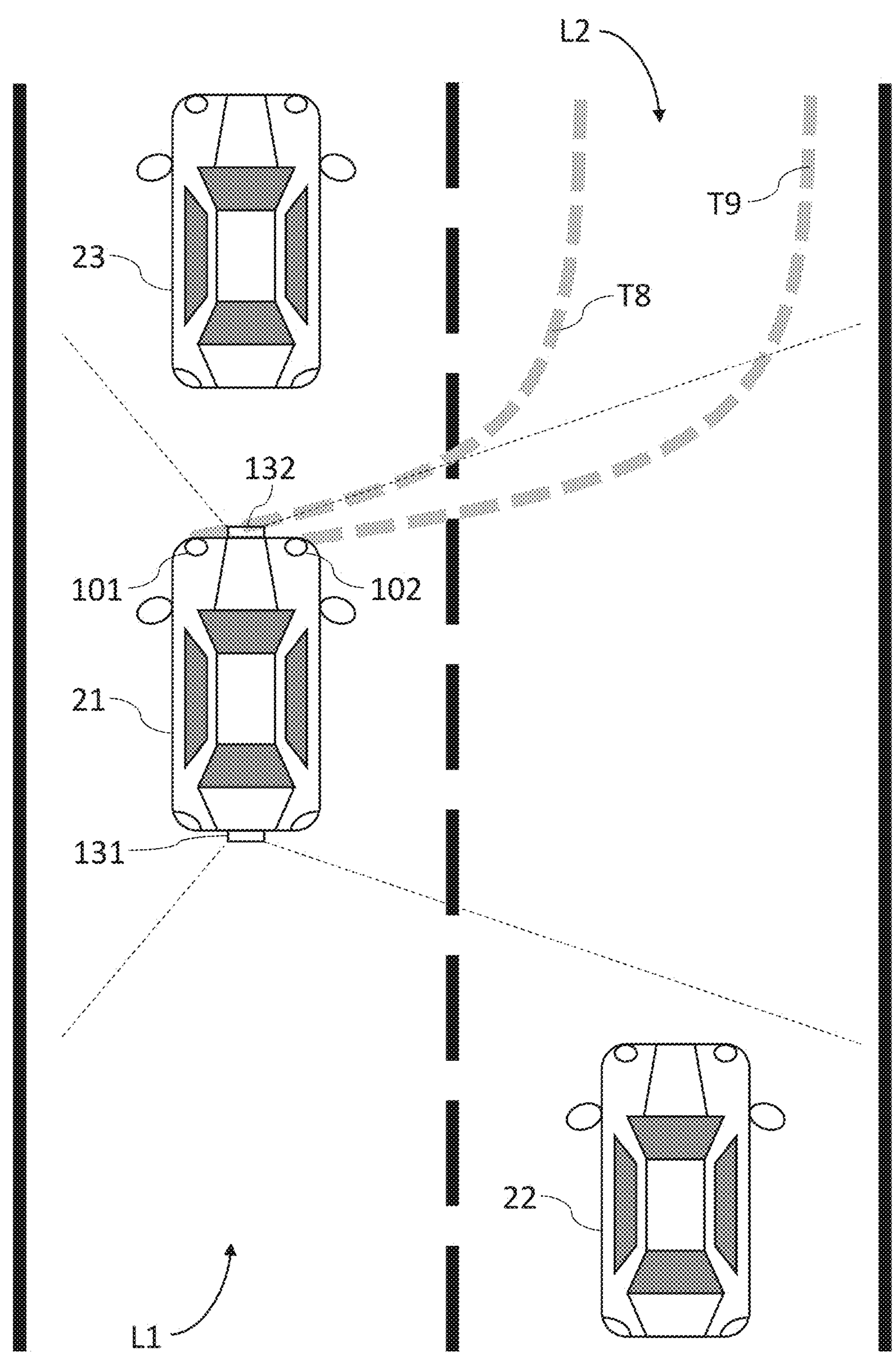
FIG. 22 illustrates a schematic view of a third embodiment of that the in-vehicle device shown in FIG. 12 projects a suggestion driving trajectory.

Take FIG. 22 for example, the first vehicle 21 drives in the first lane L1, the second vehicle 22 drives in the second lane L2 and drives behind the first vehicle 21, and the third vehicle 23 drives in the first lane L1 and drives in front of the first vehicle 21. When the first vehicle 21 wants to switch from the first lane L1 to the second lane L2, the driver of the first vehicle 21 activates a right-turn signal of the first vehicle 21 (that is, the right-turn instruction in the turn signal information of the first vehicle 21) to warn the second vehicle 22. At this moment, the in-vehicle device 10' receives the right-turn instruction and the first driving speed of the first vehicle 21 (the step S211). Then, the in-vehicle device 10' captures driving frames upon the first vehicle 21 drives in a first lane L1 through the camera module 131 disposed on the back of the first vehicle 21 and the camera module 132 disposed on the front of the first vehicle 21, and the driving frames captured by the camera modules 131, 132 comprise the image of the second vehicle 22 and the image of the third vehicle 23 (the step S212'). After that, the in-vehicle device 10' calculates the information of the second vehicle 22 (comprising the second driving speed and the first distance) and the information of the third vehicle 23 (comprising the third driving speed and the second distance) through the processing module 120 (the step S213 and the step S213'). Finally, the in-vehicle device 10' continues the step S214A, the step S214B, or the step S214C to project the suggestion driving trajectory (corresponding to the curve trajectories T8, T9) on the second lane L2. In some embodiments, the suggestion driving trajectory is selected from the system driving trajectory or the historical driving trajectory.

Figure 14:
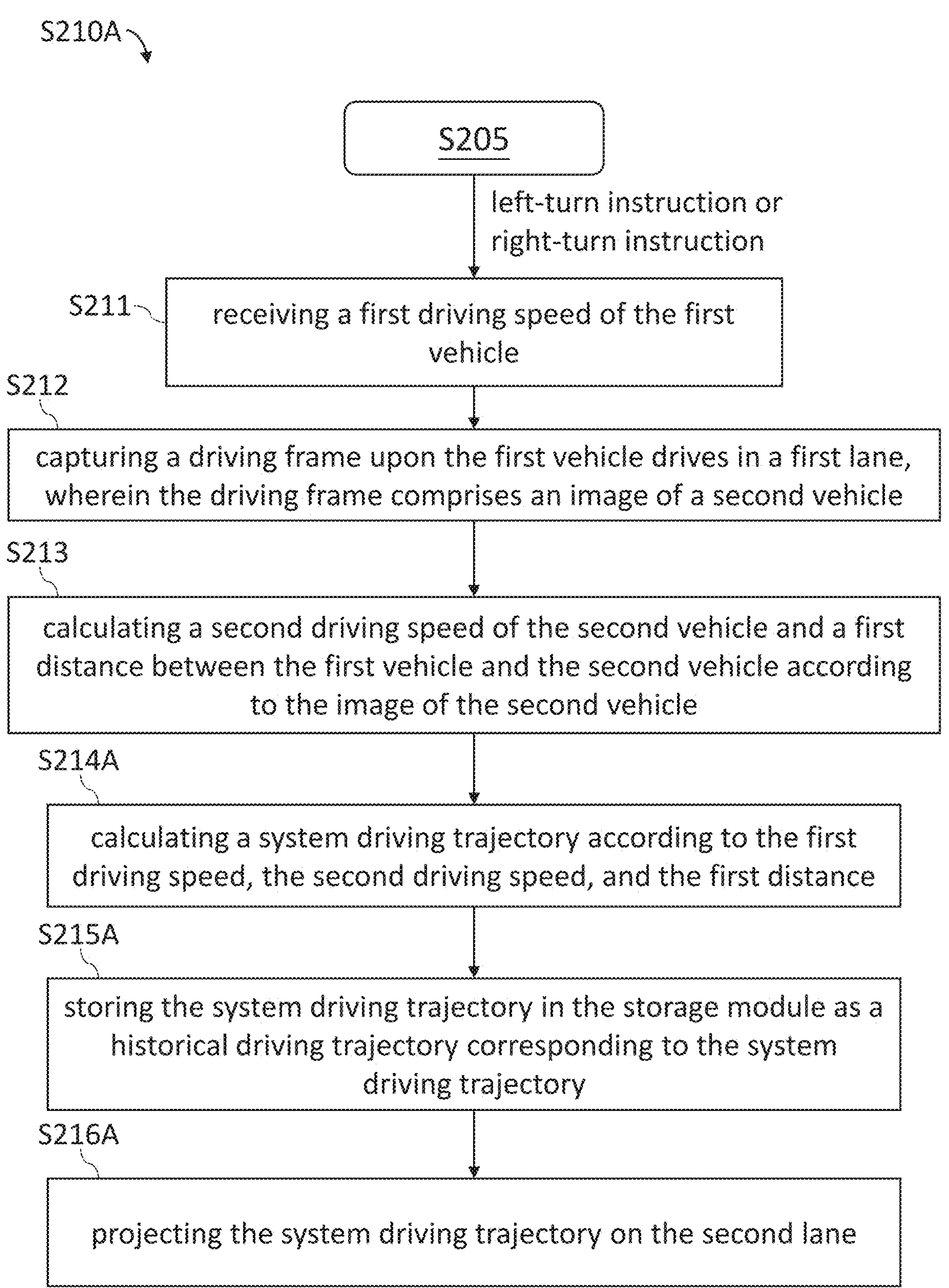
FIG. 14 illustrates a flow chart showing operations of a first embodiment of the step S210 shown in FIG. 13.
Figure 16:
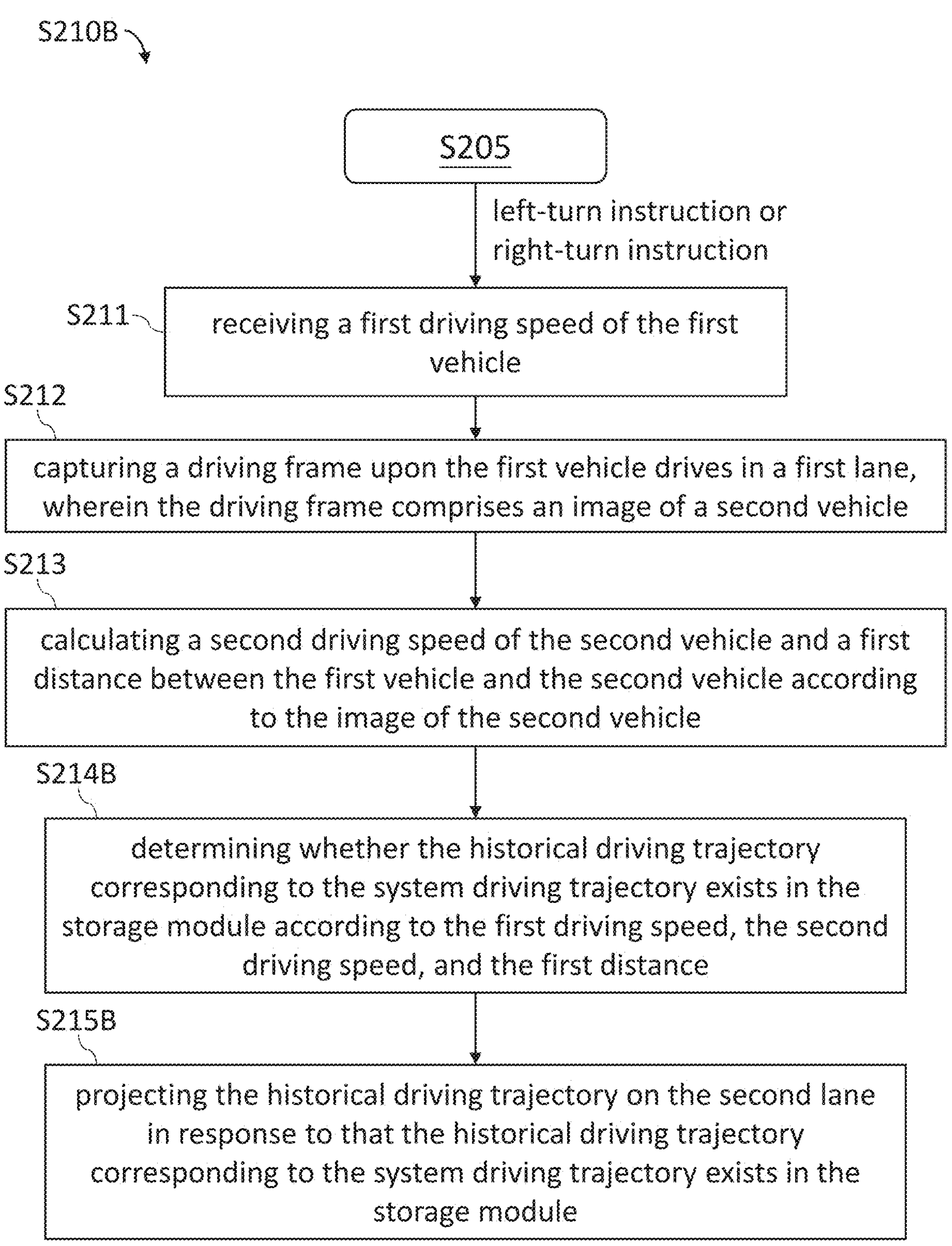
FIG. 16 illustrates a flow chart showing operations of a second embodiment of the step S210 shown in FIG. 13.

In some embodiments, the three embodiments (the step S210A, the step S210B, the step S210C) shown in FIG. 14, FIG. 16, and FIG. 18 may be respectively regarded as three modes for the in-vehicle device 10' to project the suggestion driving trajectory, and the historical driving trajectory comprises the system driving trajectory calculated by the in-vehicle device 10' in the past and a manual driving trajectory generated by the driver of the first vehicle 21. In some embodiments, the system driving trajectory is stored in the storage module 150 as the historical driving trajectory corresponding to the system driving trajectory via process of the step S210A. In some other embodiments, when the driver of the first vehicle manually drives without relying on the functions of the in-vehicle device 10', the in-vehicle device 10' generates the manual driving trajectory according to the information of the first vehicle 21 (for example, the moving direction or the driving speed) so as to store the manual driving trajectory in the storage module 150 as the historical driving trajectory corresponding to the manual driving trajectory.

For example, when the driver of the first vehicle 21 is manually doing lane switching or overtaking, the in-vehicle device 10' can record the track of the first vehicle 21 doing lane switching or overtaking and generate the manual driving trajectory according to the information of the first vehicle 21. In addition, in some embodiments, in response to that the old manual driving trajectory has been stored in the storage module 150 and the manual driving trajectory generated by the in-vehicle device 10' and the old manual driving trajectory have the same information (for example, the turn signal information and the first driving speed in TABLE 2), the in-vehicle device 10' can replace the old manual driving trajectory by the new manual driving trajectory to update driving habits for the driver of the first vehicle 21. In some embodiments, the in-vehicle device 10' can turn-on/turn-off the functions of generating the manual driving trajectory at any time.

Herein, the three embodiments shown in FIG. 14, FIG. 16, and FIG. 18 can apply the historical driving trajectories stored in the storage module 150. Effects achieved by the in-vehicle device 10' that operates in three modes will be described below.

First mode (corresponding to the step S210A in FIG. 14): the in-vehicle device 10' directly calculates the system driving trajectory as the suggestion driving trajectory and projects the suggestion driving trajectory on the ground surface through the at least one projection module 100. In addition, the in-vehicle device 10' stores the calculated system driving trajectory in the storage module 150 as the historical driving trajectory corresponding to the system driving trajectory.

Second mode (corresponding to the step S210B in FIG. 16): the in-vehicle device 10' captures the historical driving trajectory stored in the storage module 150 as the suggestion driving trajectory and projects the suggestion driving trajectory on the ground surface through the at least one projection module 100. In some embodiments, the historical driving trajectory captured by the in-vehicle device 10' may be the old system driving trajectory calculated by the in-vehicle device 10' via the first mode in the past, or the historical driving trajectory may be the manual driving trajectory that is generated when the driver of the first vehicle 21 manually drives.

Third mode (corresponding to the step S210C in FIG. 18): the in-vehicle device 10' compares securities between the historical driving trajectory stored in the storage module 150 and the system driving trajectory calculated by the processing module 120. In response to that the first vehicle 21 is safer to drive according to the historical driving trajectory (that is, in the present embodiment, the value of the first safety distance Ds1 is greater than the value of the second safety distance Ds2), the in-vehicle device 10' projects the historical driving trajectory as the suggestion driving trajectory on the ground surface; in response to that the first vehicle 21 is safer to drive according to the system driving trajectory (that is, in the present embodiment, the value of the first safety distance Ds1 is less than the value of the second safety distance Ds2), the in-vehicle device 10' projects the system driving trajectory as the suggestion driving trajectory on the ground surface. It should be noticed that, in some embodiments, since it is less meaningful for the in-vehicle device 10' to compare the old system driving trajectory with the new system driving trajectory by using the same calculation model, the in-vehicle device 10' only compares the manual driving trajectory with the system driving trajectory. In other words, in some embodiments, the historical driving trajectories that the in-vehicle device 10' used to compare with the new system driving trajectory are all the manual driving trajectories rather than the old system driving trajectory.

In some embodiments, the in-vehicle device 10' establishes a channel between the in-vehicle device 10 and a driving computer (not shown) of the first vehicle 21 through the communication module 110 to receive the turn signal information of the first vehicle 21 and the first driving speed of the first vehicle 21 and inputs the turn signal information and the first driving speed into the processing module 120. In some other embodiments, the in-vehicle device 10' directly detects the turn signal information and the first driving speed in the driving computer of the first vehicle 21 through the detection module 140 and inputs the turn signal information and the first driving speed into the processing module 120.

In some embodiments, the calculation method that the processing module 120 calculates the second driving speed and the first distance according to the image of the second vehicle 22 (or the third driving speed and the second distance according to the image of the third vehicle 23) is well known to a person having ordinary skills in the art (please refer to Taiwan patent No. TWI786960B or Taiwan patent No. TWI521484B) and will not be described in detail.

In some embodiments, the calculation method that the processing module 120 calculates the system driving trajectory according to the first driving speed, the second driving speed, and the first distance or another calculation method that the processing module 120 calculates the system driving trajectory according to the first driving speed, the second driving speed, the third driving speed, the first distance, and the second distance are well known to a person having ordinary skills in the art (please refer to China patent publication No. CN110103956A or China patent No. CN113581181B) and will not be described in detail.

In some embodiments, the projection method that the projection module 100 projects a driving trajectory (such as but not limited to a dynamic ground projection technology from Texas Instruments and a headlamp projection technology from Volkswagen) is well known to a person having ordinary skills in the art and will not be described in detail.

In some embodiments, the system driving trajectory and the historical driving trajectory are straight-line trajectories (as shown in the straight-line trajectories T0, T1 in FIG. 15). In some other embodiments, the system driving trajectory and the historical driving trajectory are curve trajectories (as shown in the curve trajectories T8, T9 in FIG. 17).

In some embodiments, the at least one projection module 100 may be a micro component that has a projection function, such as but not limited to, a lamp projector, a LED projector, or a laser projector. In some embodiments, the at least one projection module 100 may be embedded in a headlamp module of the first vehicle 21 (as shown in the projection modules 101-104 in FIG. 4 to FIG. 11). In some other embodiments, the at least one projection module 100 may be embedded on a car body of the first vehicle 21 (not shown).

In some embodiments, the communication module 110 may be a hardware component that has a wired communication function or a wireless communication function, such as but not limited to a universal serial bus (USB) connector, a Type-C connector, a Lightning connector, a Wi-Fi chip, a Bluetooth chip, or a two-in-one wireless chip with both Wi-Fi function and Bluetooth function. In other words, in some embodiments, the channel established by the communication module 110 and the first vehicle 21 may be a wired channel or a wireless channel.

In some embodiments, the processing module 120 may be a hardware component that has a computing function and a control function, such as but not limited to a central processing unit (CPU), a graphics processing unit (GPU), a microprocessor, a digital signal processor (DSP), a complex programmable logic device (CPLD), a field programmable gate array (FPGA), an application specific integrated circuits (ASIC), or a microcontroller unit (MCU).

In some embodiments, the at least one camera module 130 may be a photosensitive component that may be configured to sense an image and convert the image into electronic signals, such as but not limited to a charge-coupled device (CCD) or a complementary metal-oxide-semiconductor (CMOS) sensor. In some embodiments, the at least one camera module 130 may be embedded on the front of the first vehicle 21 and/or the back of the first vehicle 21 (as shown in the camera modules 131, 132 in FIG. 22). In some other embodiments, the at least one camera module 130 may be embedded on a front windshield of the first vehicle 21 and/or a rear windshield of the first vehicle 21 (not shown).

In some embodiments, the detection module 140 may be a hardware component that has a detection function or a data acquisition (DAQ) function, such as but not limited to a detector, an on-board diagnostics (OBD) device, a DAQ system or a DAQ interface card.

In some embodiments, the storage module 150 may be a hardware component that has a read function, a write function, and a storing function, such as but not limited to a non-volatile memory or a flash memory.

In conclusion, according to one or some embodiments, when an electronic vehicle performs the Autopilot function (for example, doing lane switching or reversing), the in-vehicle device can project the driving trajectory of the electronic vehicle on the ground surface to achieve effect of warning so that vehicles or pedestrians near the electronic vehicle can immediately react to avoid danger. In addition, even for vehicles without ADAS functions, the in-vehicle device can assist the vehicle calculating a suitable driving trajectory and project the driving trajectory on the ground surface to achieve the same effect of warning.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. An in-vehicle device adapted to be disposed on a first vehicle, wherein the in-vehicle device comprises:

at least one projection module configured to project a suggestion driving trajectory;

at least one camera module configured to capture a driving frame upon the first vehicle drives in a first lane, wherein the driving frame comprises an image of a second vehicle, and the second vehicle drives behind the first vehicle;

a communication module configured to receive a turn signal information of the first vehicle and a first driving speed of the first vehicle, wherein the turn signal information is selected from a left-turn instruction, a right-turn instruction, or a straight-driving instruction;

a processing module electrically connected to the at least one projection module, the at least one camera module, and the communication module, wherein the processing module is configured to calculate a second driving speed of the second vehicle and a first distance between the first vehicle and the second vehicle according to the image of the second vehicle; and a storage module electrically connected to the processing module;

wherein in response to that the turn signal information is the left-turn instruction or the right-turn instruction, the processing module controls the at least one projection module to project the suggestion driving trajectory on a second lane, wherein the suggestion driving trajectory is selected from a historical driving trajectory or a system driving trajectory;

in response to that the turn signal information is the straight-driving instruction, the processing module controls the at least one projecting module to stop projecting the suggestion driving trajectory on the second lane.

2. The in-vehicle device according to claim 1, wherein the processing module is further configured to calculate the system driving trajectory according to the first driving speed, the second driving speed, and the first distance, and the processing module is further configured to store the system driving trajectory in the storage module as the historical driving trajectory corresponding to the system driving trajectory, wherein the suggestion driving trajectory is the system driving trajectory.

3. The in-vehicle device according to claim 1, wherein in response to that the historical driving trajectory corresponding to the system driving trajectory exists in the storage module, the suggestion driving trajectory is the historical driving trajectory;

wherein, the historical driving trajectory has a historical turn signal information corresponding to the turn signal information, a historical first driving speed corresponding to the first driving speed, a historical second driving speed corresponding to the second driving speed, and a historical first distance corresponding to the first distance.

4. The in-vehicle device according to claim 1, wherein in response to that the historical driving trajectory exists in the storage module, the processing module is further configured to calculate the system driving trajectory according to the first driving speed, the second driving speed, and the first distance, the processing module is further configured to calculate a first safety distance between the first vehicle and the second vehicle after the first vehicle drives according to the historical driving trajectory and a second safety distance between the first vehicle and the second vehicle after the first vehicle drives according to the system driving trajectory, and the processing module is further configured to compare the first safety distance with the second safety distance;

wherein, in response to that a value of the first safety distance is greater than a value of the second safety distance, the suggestion driving trajectory is the historical driving trajectory;

in response to that the value of the first safety distance is less than the value of the second safety distance, the suggestion driving trajectory is the system driving trajectory;

the historical driving trajectory has a historical turn signal information corresponding to the turn signal information, a historical first driving speed corresponding to the first driving speed, a historical second driving speed corresponding to the second driving speed, and a historical first distance corresponding to the first distance.

5. The in-vehicle device according to claim 1, wherein the driving frame further comprises an image of a third vehicle, the third vehicle drives in the first lane and drives in front of the first vehicle, the processing module is further configured to calculate a third driving speed of the third vehicle and a second distance between the first vehicle and the third vehicle according to the image of the third vehicle, and the processing module is further configured to calculate the system driving trajectory according to the first driving speed, the second driving speed, the third driving speed, the first distance, and the second distance;

in response to that the historical driving trajectory exists in the storage module, the historical driving trajectory has a historical turn signal information corresponding to the turn signal information, a historical first driving speed corresponding to the first driving speed, a historical second driving speed corresponding to the second driving speed, a historical third driving speed corresponding to the third driving speed, a historical first distance corresponding to the first distance, and a historical second distance corresponding to the second distance.

6. A driving trajectory projection method adapted to an in-vehicle device, wherein the in-vehicle device is adapted to be disposed on a first vehicle, and the driving trajectory projection method comprises:

receiving a turn signal information of the first vehicle, wherein the turn signal information is selected from a left-turn instruction, a right-turn instruction, or a straight-driving instruction;

performing a projection step to project a suggestion driving trajectory in response to that the turn signal information is the left-turn instruction or the right-turn instruction, wherein the projection step comprises:

receiving a first driving speed of the first vehicle;

capturing a driving frame upon the first vehicle drives in a first lane, wherein the driving frame comprises an image of a second vehicle, the second vehicle drives in a second lane and drives behind the first vehicle, wherein the second lane is at a left side of the first lane or a right side of the first lane;

calculating a second driving speed of the second vehicle and a first distance between the first vehicle and the second vehicle according to the image of the second vehicle; and projecting the suggestion driving trajectory on the second lane, wherein the suggestion driving trajectory is selected from a historical driving trajectory or a system driving trajectory; and stopping projecting the suggestion driving trajectory in response to that the turn signal information is the straight driving instruction;

wherein, the historical driving trajectory is stored in a storage module.

7. The driving trajectory projection method according to claim 6, wherein the projection step further comprises:

calculating the system driving trajectory according to the first driving speed, the second driving speed, and the first distance; and storing the system driving trajectory in the storage module as the historical driving trajectory corresponding to the system driving trajectory;

wherein, the suggestion driving trajectory is the system driving trajectory.

8. The driving trajectory projection method according to claim 6, wherein in response to that historical driving trajectory corresponding to the system driving trajectory exists in the storage module, the suggestion driving trajectory is the historical driving trajectory;

wherein, the historical driving trajectory has a historical turn signal information corresponding to the turn signal information, a historical first driving speed corresponding to the first driving speed, a historical second driving speed corresponding to the second driving speed, and a historical first distance corresponding to the first distance.

9. The driving trajectory projection method according to claim 6, wherein in response to that the historical driving trajectory exists in the storage module, and the projection step further comprises:

calculating the system driving trajectory according to the first driving speed, the second driving speed, and the first distance;

calculating a first safety distance between the first vehicle and the second vehicle after the first vehicle drives according to the historical driving trajectory and a second safety distance between the first vehicle and the second vehicle after the first vehicle drives according to the system driving trajectory; and comparing the first safety distance with the second safety distance;

wherein, in response to that a value of the first safety distance is greater than a value of the second safety distance, the suggestion driving trajectory is the historical driving trajectory;

in response to that the value of the first safety distance is less than the value of the second safety distance, the suggestion driving trajectory is the system driving trajectory;

the historical driving trajectory has a historical turn signal information corresponding to the turn signal information, a historical first driving speed corresponding to the first driving speed, a historical second driving speed corresponding to the second driving speed, and a historical first distance corresponding to the first distance.

10. The driving trajectory projection method according to claim 6, wherein the driving frame further comprises an image of a third vehicle, the third vehicle drives in the first lane and drives in front of the first vehicle, and the projection step further comprises:

calculating a third driving speed of the third vehicle and a second distance between the first vehicle and the third vehicle according to the image of the third vehicle;

wherein, the system driving trajectory is calculated according to the first driving speed, the second driving speed, the third driving speed, the first distance, and the second distance;

in response to that the historical driving trajectory exists in the storage module, the historical driving trajectory has a historical turn signal information corresponding to the turn signal information, a historical first driving speed corresponding to the first driving speed, a historical second driving speed corresponding to the second driving speed, a historical third driving speed corresponding to the third driving speed, a historical first distance corresponding to the first distance, and a historical second distance corresponding to the second distance.

11. An in-vehicle device adapted to be disposed on a first vehicle, wherein the in-vehicle device comprises:

at least one projection module configured to project a remind driving trajectory;

a communication module configured to receive a gear information, a driving environment information, and a steering wheel information of the first vehicle, wherein the gear information is selected from a parking gear, a neutral gear, a driving gear, or a reverse gear;

at least one camera module configured to continuously capture the driving environment information of the first vehicle along a capturing direction of the at least one camera module; and a processing module electrically connected to the at least one projection module, the communication module, and the at least one camera module, wherein the processing module is configured to calculate the reminding driving trajectory according to the gear information, the driving environment information and the steering wheel information;

wherein, in response to that the gear information is the driving gear, the processing module controls the at least one projection module to project the reminding driving trajectory on a ground surface in front of the first vehicle;

in response to that the gear information is the reverse gear, the processing module controls the at least one projection module to project the reminding driving trajectory on a ground surface behind the first vehicle;

in response to that the gear information is the parking gear or the neutral gear, the processing module controls the at least one projection module to stop projecting the reminding driving trajectory;

wherein the reminding driving trajectory comprises at least one straight-line trajectory; and wherein the steering wheel information comprises an angle value, the angle value is within an angle range, and the angle range has a minimum value, a first middle value, a second middle value, and a maximum value;

in response to that the angle value is between the minimum value and the first middle value, the at least one straight-line trajectory is offset from a straight-line forward direction of the first vehicle by a first offset angle or is offset from a straight-line backward direction of the first vehicle by a second offset angle;

in response to that the angle value is between the first middle value and the second middle value, the at least one straight-line trajectory is parallel with a direction of a vehicle body length of the first vehicle; and in response to that the angle value is between the second middle value and the maximum value, the at least one straight-line trajectory is offset from the straight-line forward direction by another first offset angle or is offset from the straight-line backward direction by another second offset angle.

12. The in-vehicle device according to claim 11, wherein the reminding driving trajectory comprises at least one curve trajectory, and the at least one curve trajectory has a radius of curvature.

13. The in-vehicle device according to claim 12, wherein the radius of curvature is related to the angle value; and in response to that the angle value is 0 degree, the at least one curve trajectory is the at least one straight-line trajectory.

14. A driving trajectory projection method adapted to an in-vehicle device, wherein the in-vehicle device is adapted to be disposed on a first vehicle, and the driving trajectory projection method comprises:

receiving a gear information, a driving environment information and a first driving speed of the first vehicle, wherein the gear information is selected from a parking gear, a neutral gear, a driving gear, or a reverse gear;

performing a projection step to project a remind driving trajectory in response to that the gear information is the driving gear and the reverse gear and the first driving speed meets a preset condition, wherein the projection step comprises:

receiving a steering wheel information of the first vehicle;

projecting the reminding driving trajectory on a ground surface in front of the first vehicle in response to that the gear information is the driving gear and the first driving speed meets the preset condition; and projecting the reminding driving trajectory on a ground surface behind the first vehicle in response to that the gear information is the reverse gear and the first driving speed meets the preset condition;

stopping projecting the reminding driving trajectory in response to that the gear information is the parking gear and the neutral gear;

wherein the reminding driving trajectory comprises at least one straight-line trajectory;

wherein the steering wheel information comprises an angle value, the angle value is within an angle range, and the angle range has a minimum value, a first middle value, a second middle value, and a maximum value;

in response to that the angle value is between the minimum value and the first middle value, the at least one straight-line trajectory is offset from a straight-line forward direction of the first vehicle by a first offset angle or is offset from a straight-line backward direction of the first vehicle by a second offset angle;

in response to that the angle value is between the first middle value and the second middle value, the at least one straight-line trajectory is parallel with a direction for a body length of the first vehicle; and in response to that the angle value is between the second middle value and the maximum value, the at least one straight-line trajectory is offset from the straight-line forward direction by another first offset angle or is offset from the straight-line backward direction by another second offset angle.

15. The driving trajectory projection method according to claim 14, wherein the reminding driving trajectory comprises at least one curve trajectory, and the at least one curve trajectory has a radius of curvature.

16. The driving trajectory projection method according to claim 15, wherein the radius of curvature is related to the angle value; and in response to that the angle value is 0 degree, the at least one curve trajectory is the at least one straight-line trajectory.

* * * * *